US012147954B2

(12) United States Patent
Zhang

(10) Patent No.: US 12,147,954 B2
(45) Date of Patent: Nov. 19, 2024

(54) MESSAGE EXCHANGE METHOD AND APPARATUS, STORAGE MEDIUM, AND ELECTRONIC DEVICE

(71) Applicant: TENCENT TECHNOLOGY (SHENZHEN) COMPANY LIMITED, Shenzhen (CN)

(72) Inventor: Lei Zhang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 2 days.

(21) Appl. No.: 17/080,383

(22) Filed: Oct. 26, 2020

(65) Prior Publication Data

US 2021/0042725 A1 Feb. 11, 2021

Related U.S. Application Data

(63) Continuation of application No. PCT/CN2019/093067, filed on Jun. 26, 2019.

(30) Foreign Application Priority Data

Oct. 23, 2018 (CN) .......................... 201811237273.2

(51) Int. Cl.
*G06Q 20/10* (2012.01)
*G06Q 20/06* (2012.01)
(Continued)

(52) U.S. Cl.
CPC ......... *G06Q 20/102* (2013.01); *G06Q 20/065* (2013.01); *G06Q 20/085* (2013.01); *G06Q 20/14* (2013.01)

(58) Field of Classification Search
None
See application file for complete search history.

(56) References Cited

U.S. PATENT DOCUMENTS 7,366,696 B1 * 4/2008 Ganesan ................ G06Q 20/10
705/40
2010/0023450 A1 1/2010 Scipioni
(Continued)

FOREIGN PATENT DOCUMENTS

CN 105427169 A 3/2016
CN 105550860 A 5/2016
(Continued)

OTHER PUBLICATIONS

Kow, Yong Ming, Xinning Gui, and Waikuen Cheng. "Special digital monies: The design of alipay and wechat wallet for mobile payment practices in china." IFIP Conference on Human-Computer Interaction. Springer, Cham, 2017. (Year: 2017).*

(Continued)

*Primary Examiner* — David P Sharvin
*Assistant Examiner* — Brock E Turk
(74) *Attorney, Agent, or Firm* — ANOVA LAW GROUP, PLLC

(57) ABSTRACT

A message exchange method and apparatus, a non-transitory storage medium, and an electronic device are provided. The method is applied to a user equipment and includes: displaying bill information of a target bill in a window of a group session in which a target object is located, the target bill recording a resource value of a to-be-transferred virtual resource of an object comprised in a first object set and a resource value of a to-be-received virtual resource of an object comprised in a second object set; performing a virtual resource transfer operation according to a target resource value recorded in the target bill; and displaying a bill reconciliation message when a resource value transferred by the first object set reaches a total resource value of the to-be-transferred virtual resource and a resource value (Continued)

received by the second object set reaches a total resource value of the to-be-received virtual resource.

20 Claims, 11 Drawing Sheets

(51) Int. Cl.
*G06Q 20/08* (2012.01)
*G06Q 20/14* (2012.01)

(56) References Cited

U.S. PATENT DOCUMENTS

| | | | |
|---|---|---|---|
| 2012/0166332 A1* | 6/2012 | Naaman | G06Q 20/3278 705/40 |
| 2012/0173396 A1* | 7/2012 | Melby | G06Q 20/102 705/40 |
| 2012/0185355 A1* | 7/2012 | Kilroy | G06Q 30/0633 705/26.8 |
| 2013/0013516 A1 | 1/2013 | Hamilton | |
| 2014/0201067 A1* | 7/2014 | Lai | G06Q 20/29 705/39 |
| 2014/0328521 A1* | 11/2014 | Colangelo | G06Q 10/10 382/118 |
| 2015/0073959 A1* | 3/2015 | Connors | G06Q 40/00 705/35 |
| 2016/0247130 A1 | 8/2016 | Olmstead et al. | |
| 2016/0267447 A1 | 9/2016 | Davis et al. | |

FOREIGN PATENT DOCUMENTS

| | | |
|---|---|---|
| CN | 106980967 A | 7/2017 |
| CN | 107220820 A | 9/2017 |
| CN | 107248070 A | 10/2017 |
| CN | 107404500 A | 11/2017 |
| CN | 107408247 A | 11/2017 |
| CN | 109460981 A | 3/2019 |

OTHER PUBLICATIONS

Kow, Yong Ming, Xinning Gui, and Waikuen Cheng. "Special digital monies: The design of alipay and wechat wallet for mobile payment practices in china." Human-Computer Interaction—INTERACT 2017: 16th IFIP TC 13 International Conference, Mumbai, India, Proceedings, Part IV 16. Springer International Pub (Year: 2017).*

The World Intellectual Property Organization (WIPO) International Search Report for PCT/CN2019/093067 Sep. 30, 2019 5 Pages (including translation).

The State Intellectual Property Office of the People's Republic of China (SIPO) Office Action 1 for 201811237273.2, Oct. 22, 2020 13 Pages (including translation).

* cited by examiner

MESSAGE EXCHANGE METHOD AND APPARATUS, STORAGE MEDIUM, AND ELECTRONIC DEVICE

CROSS-REFERENCES TO RELATED APPLICATIONS

This application is a continuation application of PCT Patent Application No. PCT/CN2019/093067, filed on Jun. 26, 2019, which claims priority to Chinese Patent Application No. 201811237273.2, filed with the National Intellectual Property Administration, PRC on Oct. 23, 2018 and entitled "MESSAGE EXCHANGE METHOD AND APPARATUS, STORAGE MEDIUM, AND ELECTRONIC DEVICE", the entire contents of both of which are incorporated herein by reference.

FIELD OF THE TECHNOLOGY

The present disclosure relates to the field of computers, and in particular, to message exchange.

BACKGROUND OF THE DISCLOSURE

With the development of network security technologies, a growing number of users start to select to complete a transaction activity online. A large quantity of generated electronic bill also become increasingly complex. For example, for an electronic bill involving a plurality of user objects, reconciliation/verification processing for the electronic bill is usually completed in a group session including the plurality of user objects. Specifically, the plurality of user objects involved in the electronic bill pre-determine, offline, an amount to be paid or charged, and then separately perform transfer or collection operation in the group session according to the amount, to complete reconciliation processing of the bill.

Currently, in a method or computer system for performing reconciliation processing on an electronic bill provided in the related art, an amount to be reconciled usually needs to be determined in advance offline, and then one-way exchange is simply performed on a bill message of the electronic bill in a group session, to complete reconciliation processing.

SUMMARY

Embodiments of the present disclosure provide a message exchange method and apparatus, a storage medium, and an electronic device, to resolve at least the technical problem in the related art that processing efficiency of a bill is low because a reconciliation processing operation is complex. Embodiments of the present disclosure also resolve other technical problems.

According to an aspect of the embodiments of the present disclosure, a message exchange method is provided, including: receiving, by a server, a bill creation request initiated through a group session; generating, by the server in response to the bill creation request, a target bill, the target bill recording a resource value of a to-be-transferred virtual resource of an object included in a first object set and a resource value of a to-be-received virtual resource of an object included in a second object set, a total resource value of the to-be-transferred virtual resource recorded in the target bill being equal to a total resource value of the to-be-received virtual resource recorded in the target bill, the object included in the first object set and the object included in the second object set being located in the group session; transmitting, by the server, the target bill to the object included in the first object set and the object included in the second object set, so that the object included in the first object set performs a virtual resource transfer operation according to the resource value of the to-be-transferred virtual resource recorded in the target bill and the object included in the second object set performs a virtual resource receiving operation according to the resource value of the to-be-received virtual resource recorded in the target bill; and indicating, by the server, that the target bill has been reconciled when a resource value of a virtual resource transferred by the first object set reaches the total resource value of the to-be-transferred virtual resource and a resource value of a virtual resource received by the second object set reaches the total resource value of the to-be-received virtual resource.

According to another aspect of the embodiments of the present disclosure, a message exchange method is further provided, including: displaying, by user equipment, bill information of a target bill in a session window of a group session in which a target object is located, the to-be-processed target bill recording a resource value of a to-be-transferred virtual resource of an object included in a first object set and a resource value of a to-be-received virtual resource of an object included in a second object set, a total resource value of the to-be-transferred virtual resource recorded in the target bill being equal to a total resource value of the to-be-received virtual resource recorded in the target bill, the object included in the first object set and the object included in the second object set being located in the group session, the target object being located in the first object set; performing, by the user equipment, a virtual resource transfer operation according to a first target resource value recorded in the target bill, the first target resource value being used for identifying a virtual resource to be transferred by the target object; and displaying, by the user equipment, a bill reconciliation message when a resource value of a virtual resource transferred by the first object set reaches the total resource value of the to-be-transferred virtual resource and a resource value of a virtual resource received by the second object set reaches the total resource value of the to-be-received virtual resource, the bill reconciliation message being used for indicating that the target bill has been reconciled.

In some embodiments, the message exchange method also includes: performing, by the user equipment, a virtual resource receiving operation according to a second target resource value recorded in the target bill, the second target resource value being used for identifying a virtual resource to be received by the target object.

According to still another aspect of the embodiments of the present disclosure, a message exchange method is further provided, including: displaying, by user equipment, bill information of a target bill in a session window of a group session in which a target object is located, the to-be-processed target bill recording a resource value of a to-be-transferred virtual resource of an object included in a first object set and a resource value of a to-be-received virtual resource of an object included in a second object set, a total resource value of the to-be-transferred virtual resource recorded in the target bill being equal to a total resource value of the to-be-received virtual resource recorded in the target bill, the object included in the first object set and the object included in the second object set being located in the group session, and the target object being located in the second object set; performing, by the user equipment, a virtual resource receiving operation according to a first target resource value recorded in the target bill, the first target resource value being used for identifying a virtual resource to be received by the target object; and displaying, by the user equipment, a bill reconciliation message when a resource value of a virtual resource transferred by the first object set reaches the total resource value of the to-be-transferred virtual resource and a resource value of a virtual resource received by the second object set reaches the total resource value of the to-be-received virtual resource, the bill reconciliation message being used for indicating that the target bill has been reconciled.

In some embodiments, the message exchange method also includes: performing, by the user equipment, a virtual resource transfer operation according to a second target resource value recorded in the target bill, the second target resource value being used for identifying a virtual resource to be transferred by the target object.

According to still another aspect of the embodiments of the present disclosure, a message exchange apparatus is further provided, including: a first receiving unit, configured to receive a bill creation request initiated through a group session; a generation unit, configured to generate a target bill in response to the bill creation request, the target bill recording a resource value of a to-be-transferred virtual resource of an object included in a first object set and a resource value of a to-be-received virtual resource of an object included in a second object set, a total resource value of the to-be-transferred virtual resource recorded in the target bill being equal to a total resource value of the to-be-received virtual resource recorded in the target bill, the object included in the first object set and the object included in the second object set being located in the group session; a first transmitting unit, configured to transmit the target bill to the object included in the first object set and the object included in the second object set, so that the object included in the first object set performs a virtual resource transfer operation according to the resource value of the to-be-transferred virtual resource recorded in the target bill and the object included in the second object set performs a virtual resource receiving operation according to the resource value of the to-be-received virtual resource recorded in the target bill; and a second transmitting unit, configured to instruct the target bill to be reconciled when a resource value of a virtual resource transferred by the first object set reaches the total resource value of the to-be-transferred virtual resource and a resource value of a virtual resource received by the second object set reaches the total resource value of the to-be-received virtual resource.

According to still another aspect of the embodiments of the present disclosure, a message exchange apparatus is further provided, including: a first display unit, configured to display bill information of a target bill in a session window of a group session in which a target object is located, the to-be-processed target bill recording a resource value of a to-be-transferred virtual resource of an object included in a first object set and a resource value of a to-be-received virtual resource of an object included in a second object set, a total resource value of the to-be-transferred virtual resource recorded in the target bill being equal to a total resource value of the to-be-received virtual resource recorded in the target bill, the object included in the first object set and the object included in the second object set being located in the group session, the target object being located in the first object set; an execution unit, configured to perform a virtual resource transfer operation according to a target resource value recorded in the target bill, the target resource value being used for identifying a virtual resource to be transferred by the target object; and a second display unit, configured to display a bill reconciliation message when a resource value of a virtual resource transferred by the first object set reaches the total resource value of the to-be-transferred virtual resource and a resource value of a virtual resource received by the second object set reaches the total resource value of the to-be-received virtual resource, the bill reconciliation message being used for indicating that the target bill has been reconciled.

According to still another aspect of the embodiments of the present disclosure, a message exchange apparatus is further provided, including: a first display unit, configured to display bill information of a target bill in a session window of a group session in which a target object is located, the to-be-processed target bill recording a resource value of a to-be-transferred virtual resource of an object included in a first object set and a resource value of a to-be-received virtual resource of an object included in a second object set, a total resource value of the to-be-transferred virtual resource recorded in the target bill being equal to a total resource value of the to-be-received virtual resource recorded in the target bill, the object included in the first object set and the object included in the second object set being located in the group session, and the target object being located in the second object set; an execution unit, configured to perform a virtual resource receiving operation according to a target resource value recorded in the target bill, the target resource value being used for identifying a virtual resource to be received by the target object; and a second display unit, configured to display a bill reconciliation message when a resource value of a virtual resource transferred by the first object set reaches the total resource value of the to-be-transferred virtual resource and a resource value of a virtual resource received by the second object set reaches the total resource value of the to-be-received virtual resource, the bill reconciliation message being used for indicating that the target bill has been reconciled.

According to still another aspect of the embodiments of the present disclosure, a non-transitory storage medium is further provided. The storage medium stores a computer program, the computer program being configured to perform any one of the foregoing message exchange methods when run.

In some embodiments, the non-transitory storage medium is provided. The storage medium stores a computer program, the computer program being configured, when run, to perform: receiving a bill creation request initiated through a group session; generating, in response to the bill creation request, a target bill, the target bill recording a resource value of a to-be-transferred virtual resource of an object included in a first object set and a resource value of a to-be-received virtual resource of an object included in a second object set, a total resource value of the to-be-transferred virtual resource recorded in the target bill being equal to a total resource value of the to-be-received virtual resource recorded in the target bill, the object included in the first object set and the object included in the second object set being located in the group session; transmitting the target bill to the object included in the first object set and the object included in the second object set, so that the object included in the first object set performs a virtual resource transfer operation according to the resource value of the to-be-transferred virtual resource recorded in the target bill and the object included in the second object set performs a virtual resource receiving operation according to the resource value of the to-be-received virtual resource recorded in the target bill; and indicating that the target bill has been reconciled when a resource value of a virtual resource transferred by the first object set reaches the total resource value of the to-be-transferred virtual resource and a resource value of a virtual resource received by the second object set reaches the total resource value of the to-be-received virtual resource.

According to still another aspect of the embodiments of the present disclosure, an electronic device is further provided, including a memory, a processor, and a computer program stored in the memory and executable on the processor, the processor performing any one of the foregoing message exchange methods by using the computer program.

In some embodiments, the electronic device is provided, including a memory, a processor, and a computer program stored in the memory and executable on the processor, the processor performing: receiving a bill creation request initiated through a group session; generating, in response to the bill creation request, a target bill, the target bill recording a resource value of a to-be-transferred virtual resource of an object included in a first object set and a resource value of a to-be-received virtual resource of an object included in a second object set, a total resource value of the to-be-transferred virtual resource recorded in the target bill being equal to a total resource value of the to-be-received virtual resource recorded in the target bill, the object included in the first object set and the object included in the second object set being located in the group session; transmitting the target bill to the object included in the first object set and the object included in the second object set, so that the object included in the first object set performs a virtual resource transfer operation according to the resource value of the to-be-transferred virtual resource recorded in the target bill and the object included in the second object set performs a virtual resource receiving operation according to the resource value of the to-be-received virtual resource recorded in the target bill; and indicating that the target bill has been reconciled when a resource value of a virtual resource transferred by the first object set reaches the total resource value of the to-be-transferred virtual resource and a resource value of a virtual resource received by the second object set reaches the total resource value of the to-be-received virtual resource.

BRIEF DESCRIPTION OF THE DRAWINGS

Accompanying drawings described herein are used to provide further understanding about the present disclosure, and constitute one portion of the present disclosure. Exemplary embodiments of the present disclosure and their descriptions are used to explain the present disclosure, and do not constitute an inappropriate limitation on the present disclosure. In the accompanying drawings.

DESCRIPTION OF EMBODIMENTS

To make a person skilled in the art understand the technical solutions in the present disclosure better, the following clearly and completely describes the technical solutions in the embodiments of the present disclosure with reference to the accompanying drawings in the embodiments of the present disclosure. Apparently, the described embodiments are merely some rather than all of the embodiments of the present disclosure. All other embodiments obtained by a person of ordinary skill in the art based on the embodiments of the present disclosure without creative efforts shall fall in the protection scope of the present disclosure.

In the specification, claims, and accompanying drawings of the present disclosure, the terms "first", "second", and so on are intended to distinguish between similar objects but do not necessarily indicate a specific order or sequence. It is to be understood that the data termed in such a way are interchangeable in proper circumstances so that the embodiments of the present disclosure described herein can be implemented in other orders than the order illustrated or described herein. Moreover, the terms "include", "contain" and any other variants mean to cover the non-exclusive inclusion, for example, a process, method, system, product, or device that includes a list of operations or units is not necessarily limited to those expressly listed operations or units, but may include other operations or units not expressly listed or inherent to such a process, method, system, product, or device.

Figure 1:
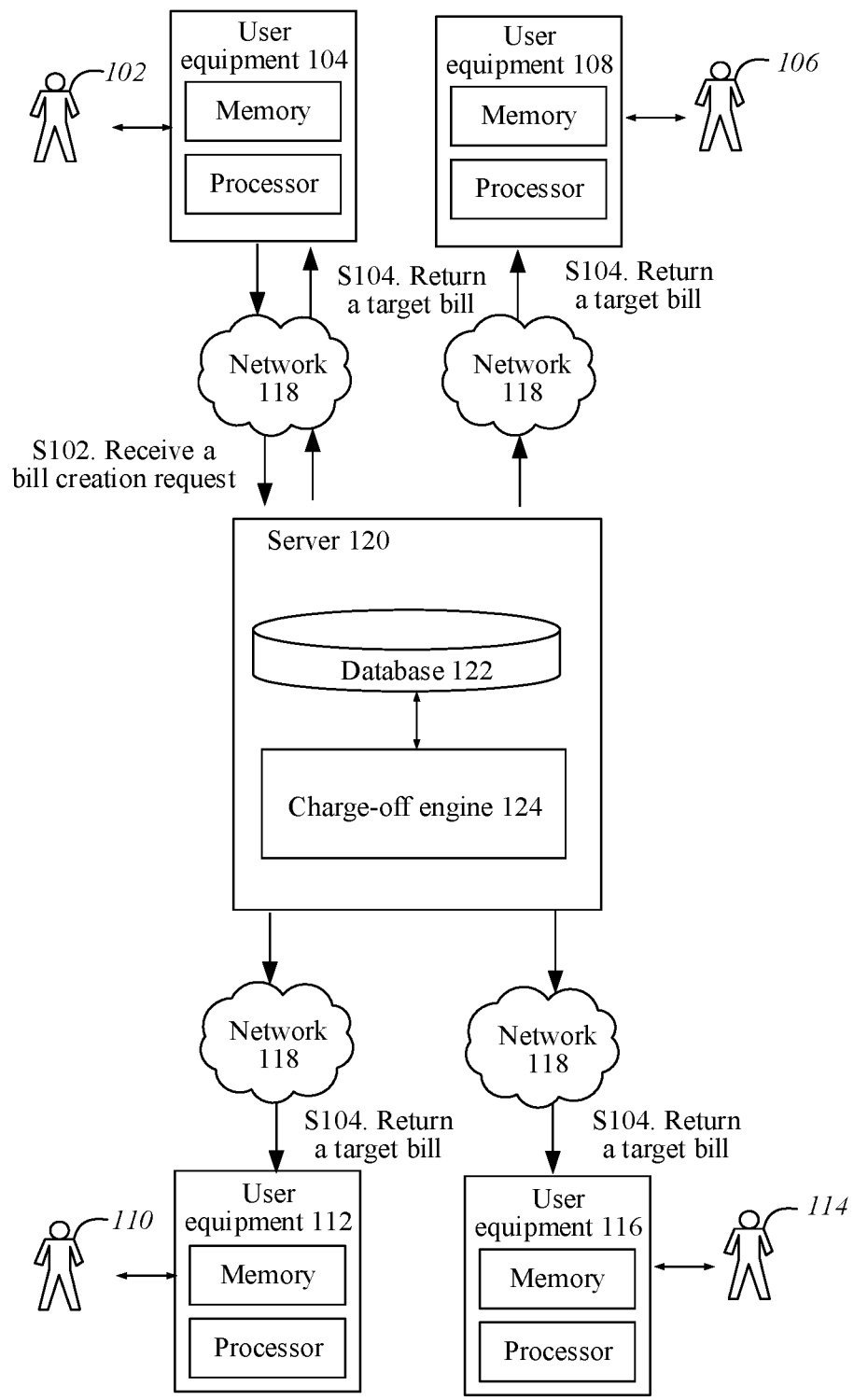
FIG. 1 is a schematic diagram of an application environment of an optional message exchange method according to an embodiment of the present disclosure.

According to an aspect of the embodiments of the present disclosure, a message exchange method is provided. Optionally, as an optional implementation, the message exchange method may be applied to, but not limited to, an environment shown in FIG. 1.

A user 102 may perform man-machine interaction with user equipment 104, man-machine interaction is performed between a user 106 and user equipment 108, man-machine interaction is performed between a user 110 and user equipment 112, and data exchange is performed between a user 114 and user equipment 116. The user 102 and the user 106 form a first object set, and the user 110 and the user 114 form a second object set. A server 120 includes a database 122 and a reconciliation engine 124. The server 120 receives, through a network 118, a bill creation request transmitted by the user equipment 104 in step S102, generates a target bill in response to the bill creation request, and transmits the target bill to the user equipment 104, the user equipment 108, the user equipment 112, and the user equipment 116 in step S104. In this way, the user 102 and the user 106 transfer virtual resources according to the target bill, and the user 110 and the user 114 receive virtual resources according to the target bill. When a total value of the transferred virtual resource is equal to a total value of the received virtual resource, the server 120 indicates that the target bill has been reconciled.

In the related art, for the problem of transferring resource values of virtual resources of a plurality of people, if more people are involved, a transfer process is relatively complex, and a complex operation is required to complete the transfer of the resource value of the virtual resource. In some embodiments, after the bill creation request is obtained, the target bill is generated, virtual resources are obtained from all objects in the first object set according to the target bill, and the virtual resources are transferred to all objects in the second object set, to achieve the objective of transferring the virtual resource by performing one operation on all the objects in the first object set and the second object set, thereby improving efficiency of transferring the virtual resource.

The message exchange method may be applied to, but not limited to, a terminal that can calculate data. The user equipment 104, the user equipment 108, the user equipment 112, and the user equipment 116 may be, but are not limited to, a terminal such as a mobile phone, a tablet computer, a notebook computer, or a PC. The network may include, but not limited to, a wireless network or a wired network. The wireless network includes: Wi-Fi, and another network implementing wireless communication. The wired network may include but is not limited to: a wide area network, a metropolitan area network, and a local area network. The server 120 may be, but is not limited to, any hardware device capable of performing data computation.

Figure 2:
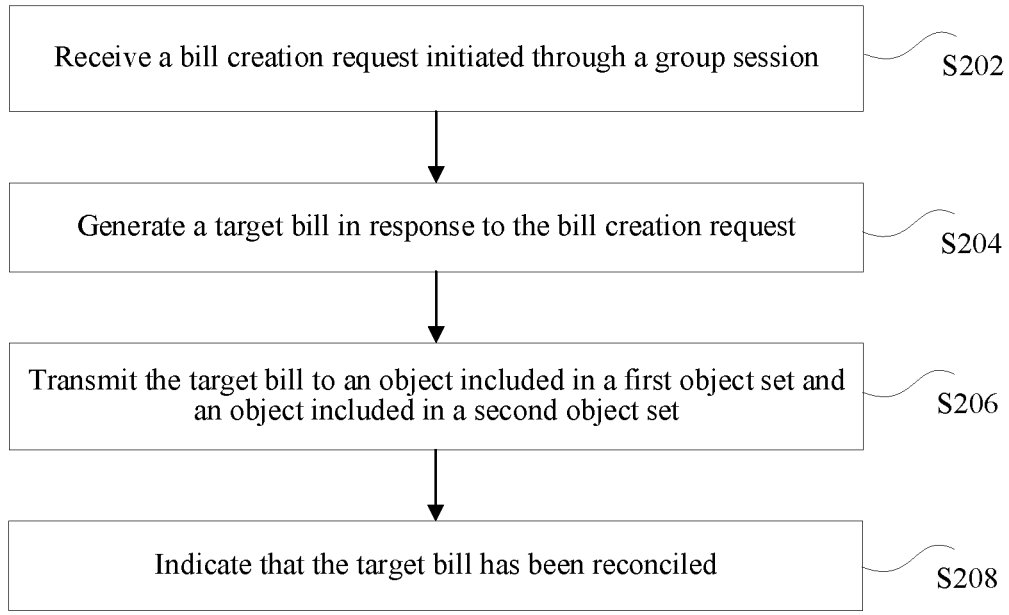
FIG. 2 is a schematic flowchart of an optional message exchange method according to an embodiment of the present disclosure.

Optionally, as an optional implementation, as shown in FIG. 2, the message exchange method may be implemented by using the server and may include:

S202. Receive a bill creation request initiated through a group session.

A specific initiation location for initiating the bill creation request is not limited in some embodiments of the present disclosure, provided that the bill creation request is initiated by the group session.

In a possible implementation, the bill creation request may be initiated by a session window of the group session.

S204. Generate a target bill in response to the bill creation request, the target bill recording a resource value of a to-be-transferred virtual resource of an object included in a first object set and a resource value of a to-be-received virtual resource of an object included in a second object set, a total resource value of the to-be-transferred virtual resource recorded in the target bill being equal to a total resource value of the to-be-received virtual resource recorded in the target bill, and the object included in the first object set and the object included in the second object set being located in the group session.

S206. Transmit the target bill to the object included in the first object set and the object included in the second object set, so that the object included in the first object set performs a virtual resource transfer operation according to the resource value of the to-be-transferred virtual resource recorded in the target bill and the object included in the second object set performs a virtual resource receiving operation according to the resource value of the to-be-received virtual resource recorded in the target bill.

S208. Indicate that the target bill has been reconciled when a resource value of a virtual resource transferred by the first object set reaches the total resource value of the to-be-transferred virtual resource recorded in the target bill and a resource value of a virtual resource received by the second object set reaches the total resource value of the to-be-received virtual resource recorded in the target bill.

Optionally, the message exchange method may be applied to, but not limited to, the field of multi-people transfer of a multi-people session, or a process of asset transfer between a plurality of accounts of a person, or a process of article sale in the market that a plurality of people participate in, or the process of asset transfer in a multi-people game in the game field.

Optionally, the group session may be, but is not limited to, a session that a plurality of people participate in. The message exchange method being applied to the field of multi-people transfer of a multi-people session is described. The multi-people session may be, but is not limited to, a group session. An object in the group session initiates a bill creation request, and the bill creation request records a first object set for transferring a virtual resource value and a second object set for receiving a virtual resource value. Objects included in the first object set do not overlap objects included in the second object set. All the objects in the first object set transfer virtual resources according to a target bill, and a server receives the transferred virtual resources and transmits the transferred virtual resources to all the objects in the second object set according to the target bill.

Figure 3:
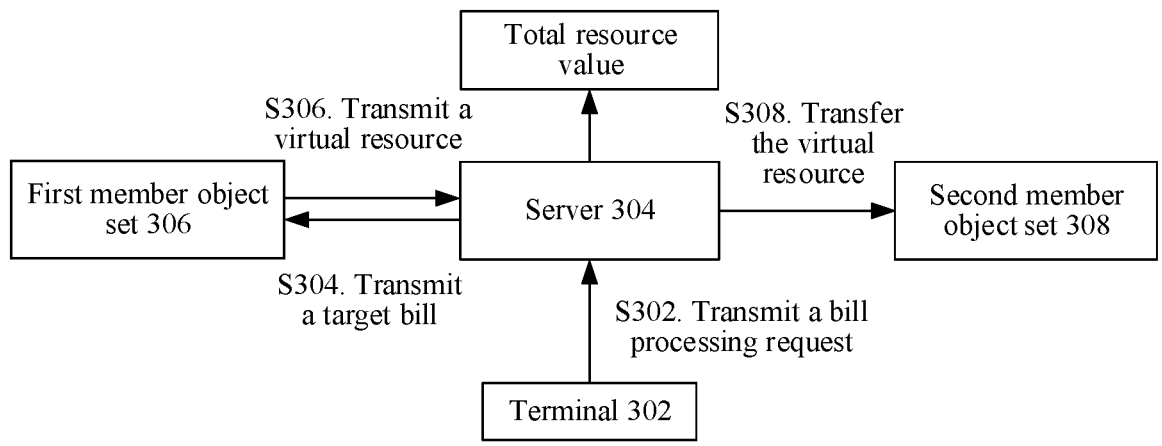
FIG. 3 is a schematic diagram of an optional message exchange method according to an embodiment of the present disclosure.

For example, the object initiating the bill creation request is not included in the first object set and the second object set. As shown in FIG. 3, after obtaining a bill processing request, a terminal 302 transmits the bill processing request to a server 304 in step S302, so that the server 304 generates a target bill according to the bill processing request. Then, the target bill is transmitted to a first member object set 306 in step S304. The first member object set 306 transmits a virtual resource to the server 304 in step S306, and the server 304 transfers the virtual resource to a second member object set 308 in step S308.

The server 304 may be, but is not limited to, any hardware device that may provide a server function, or the server 304 may be replaced with, but not limited to, a terminal device on which a server is built. For example, the server 304 is built on the terminal device, and the terminal device provides a function provided by the server 304.

According to the method in some embodiments, after the bill creation request is obtained, the target bill is generated, virtual resources are obtained from all the objects in the first object set according to the target bill, and the virtual resources are transferred to all the objects in the second object set, to achieve the objective of transferring the virtual resource by performing one operation on all the objects in the first object set and the second object set, thereby simplifying the operation of transferring the virtual resource and improving efficiency of processing a bill.

Optionally, the bill creation request may be triggered by, but not limited to, an object in the first object set, or triggered by an object in the second object set, or triggered by another object in the group session. The another object does not belong to the first object set and the second object set. That is, the target bill in the initiated bill processing request may include an initiator, or may not include an initiator.

Figure 4:
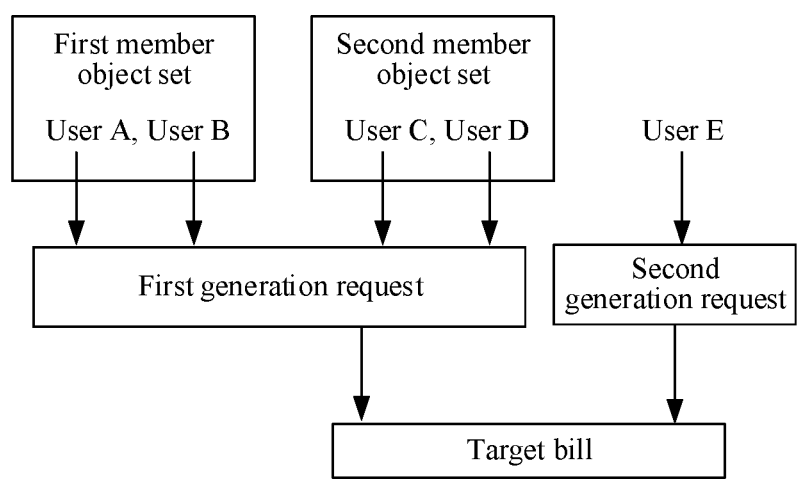
FIG. 4 is a schematic diagram of another optional message exchange method according to an embodiment of the present disclosure.

For example, the message exchange method is applied to the field of multi-people transfer of a multi-people session. As shown in FIG. 4, a group session includes five objects, which are respectively: an object A, an object B, an object C, an object D, and an object E. The object A, the object B, the object C, and the object D in the five people need to perform multi-people transfer, and the object E does not need to perform multi-people transfer. In this case, any one of the object A, the object B, the object C, and the object D may initiate a bill creation request. After receiving the bill creation request, a server generates a target bill. For example, in the target bill, the object A and the object B are objects in a first object set, and the object C and the object D are objects in a second object set. Alternatively, the object E initiates a bill creation request, and after receiving the bill creation request, a server generates a target bill. For example, in the target bill, the object A and the object B are objects in a first object set, and the object C and the object D are objects in a second object set.

Optionally, when indicating that the target bill has been reconciled, the server may, but not limited to, transmit a bill reconciliation message to the object in the first object set and the object in the second object set, the bill reconciliation message being used for indicating that the target bill has been reconciled. The server may store a processing result of the bill for subsequent viewing by the object initiating the bill creation request or any object in the first object set and the second object set.

Optionally, the bill creation request received by the server may be, but not limited to, generated by performing an operation on a client by using any object in the group session. For example, any object in the group session clicks a button in a session window of the group session, or any object in the group session initiates a predetermined instruction to the client, for example, shaking, for triggering a predetermined gesture on a touchscreen. After receiving the instruction, the client enters a bill creation interface. After a bill is created, the client initiates a bill creation request to the server.

Figure 5:
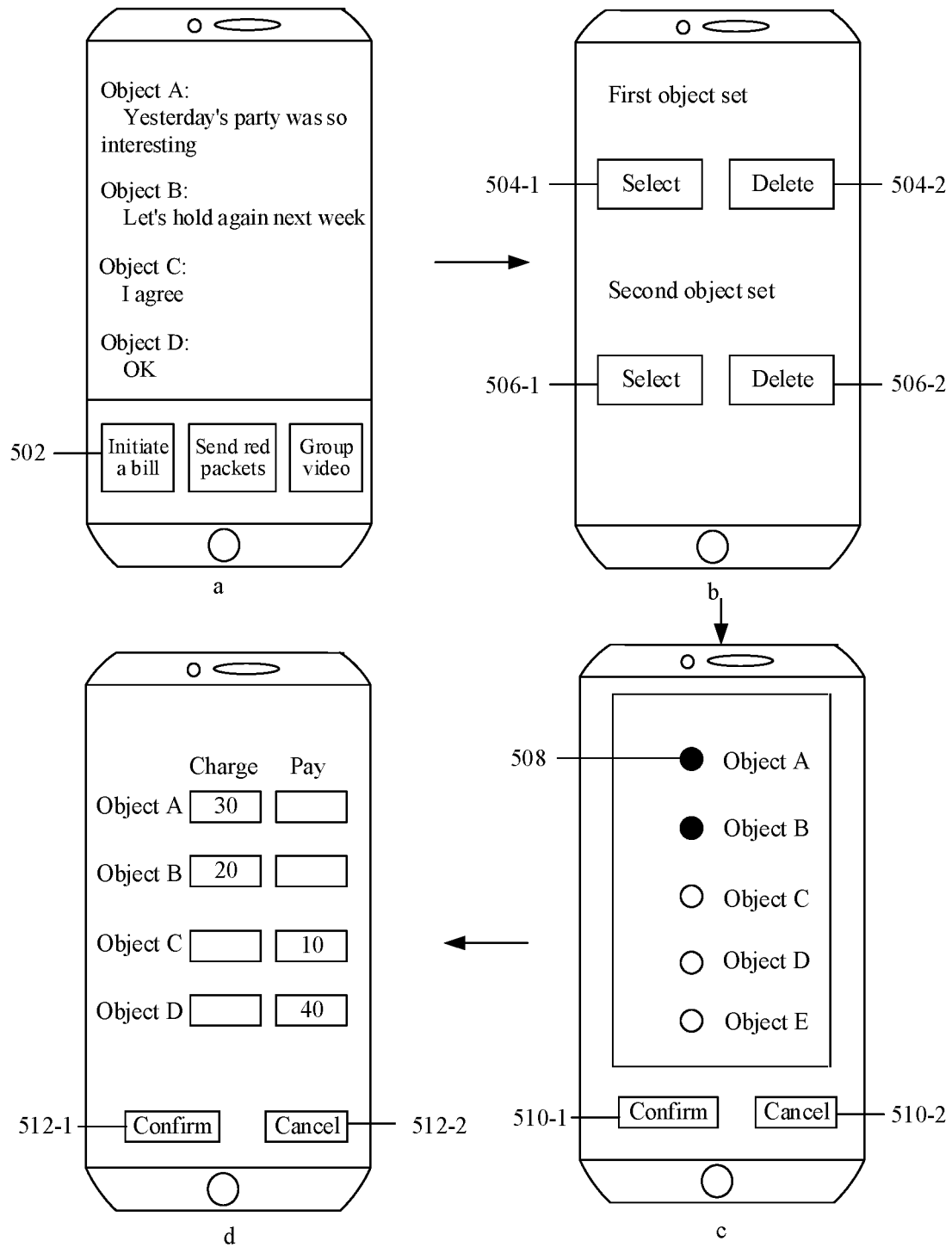
FIG. 5 is a schematic diagram of still another optional message exchange method according to an embodiment of the present disclosure.

For example, a button is set in the session window. After the button is pressed, the client initiates a bill creation request to the server. As shown in FIG. 5, FIG. 5 includes a display interface a, a display interface b, a display interface c, and a display interface d. A chat record between an object A, an object B, an object C, and an object D is displayed in FIG. 5*a*, the object A, the object B, the object C, the object D, and an object E form a group session, and the object E does not speak currently. A bill initiating button 502 is displayed on the display interface of FIG. 5*a*. After the bill initiating button 502 is pressed, the picture jumps to the display interface of FIG. 5*b*. A selection key 504-1, a deletion key 504-2, a selection key 506-1, and a deletion key 506-2 are displayed in FIG. 5*b*. The selection key 504-1 is configured to select a first object set, the deletion key 504-2 is configured to delete the selected first object set, the selection key 506-1 is configured to select a second object set, and the deletion key 506-2 is configured to delete the selected second object set. After the selection key 504-1 or the selection key 506-1 in FIG. 5*b* is pressed, the picture jumps to a picture displayed in FIG. 5*c*. All members in a current group session are displayed in FIG. 5*c* (as another example, when all members in a group session are displayed in FIG. 5*c*, a bill initiator may not be displayed). Each member in the group session corresponds to a selection identifier 508, after receiving the selection identifier 508 that is pressed, a terminal selects members in the group session corresponding to the selection identifier 508, and the object A and the object B in FIG. 5*c* are selected. If a cancel key 510-2 in FIG. 5*c* is pressed, the current selection is canceled, and the picture returns to the interface displayed in FIG. 5*b* or the interface displayed in FIG. 5*a*. After a confirm button 510-1 in FIG. 5*c* is pressed, the selected object A and object B are used as objects in the first object set or the second object set. After the members in the first object set and the members in the second object set are determined and a resource value of a virtual resource that is to be obtained or paid by each member is determined, the interface shown in FIG. 5*d* is displayed, virtual values of virtual resources that are to be received and paid by the object A, the object B, the object C, and the object D are displayed in the interface, and a confirm key 512-1 and a cancel key 512-2 are displayed. After the confirm key 512-1 is pressed, a bill is initiated, and after the cancel key 512-2 is pressed, the bill initiation is canceled.

According to the method in some embodiments, after the bill creation request is obtained, the target bill is generated, virtual resources are obtained from all the objects in the first object set according to the target bill, and the virtual resources are transferred to all the objects in the second object set, to achieve the objective of transferring the virtual resource by performing one operation on all the objects in the first object set and the second object set, thereby simplifying the operation of transferring the virtual resource and improving efficiency of processing a bill.

As an optional implementation, the transmitting the target bill to the object included in the first object set and the object included in the second object set includes:

(1) synchronously transmitting the target bill to the object included in the first object set and the object included in the second object set; or (2) asynchronously transmitting the target bill to the object included in the first object set and the object included in the second object set.

Optionally, after generating the target bill, the server may, but not limited to, synchronously or asynchronously transmit the target bill to the object in the first object set and the object in the second object set.

For example, after receiving the bill creation request and generating the target bill, the server may, but not limited to, transmit the generated target bill to the object in the first object set and the object in the second object set immediately or at a preset time, or transmit the target bill to the object in the first object set first, and then transmit the target bill to the object in the second object set, or transmit the target bill to the object in the second object set first, and then transmit the target bill to the object in the first object set.

For example, the example in which a group session includes five objects, which are respectively an object A, an object B, an object C, an object D, and an object E continues to be used. The server receives a bill creation request transmitted by the object A, and the server generates a target bill according to the bill creation request, the target bill indicating that the object A and the object B need to transfer a virtual resource to the object C and the object D, that is, the object A and the object B form a first object set, and the object C and object D form a second object set. The server transmits the target bill to the object A and the object B first, and then transmits the target bill to the object C and the object D. Alternatively, the server transmits the target bill to the object A, the object B, the object C, and the object D simultaneously.

By using some embodiments, the server synchronously or asynchronously transmits the target bill to the object in the first object set and the object in the second object set, thereby ensuring efficiency of transferring a virtual resource and improving flexibility of transferring a virtual resource.

As an optional implementation, the asynchronously transmitting the target bill to the object included in the first object set and the object included in the second object set includes:
(1) transmitting the target bill to the object included in the first object set, and transmitting, when the resource value of the virtual resource transferred by the first object set has reached the total resource value of the to-be-transferred virtual resource, the target bill to the object included in the second object set; or
(2) transmitting the target bill to the object included in the second object set, and transmitting, when the resource value of the virtual resource received by the second object set has reached the total resource value of the to-be-received virtual resource, the target bill to the object included in the first object set.

For example, the example in which a group session includes five objects, which are respectively an object A, an object B, an object C, an object D, and an object E continues to be used. The object A and the object B form a first object set, and the object C and object D form a second object set. The server transmits a target bill to the object A and the object B first, and the object A and the object C transfer virtual resources. After the object A and the object B complete the virtual resource transfer, the server receives the virtual resources transferred by the object A and the object B. Subsequently, the server transmits the target bill to the object C and the object D, and the object C and the object D receive the virtual resources. Alternatively, the server transmits the target bill to the object C and the object D first, and the object C and the object D receive virtual resources first. After the object C and the object D receive the virtual resources, the server transmits the target bill to the object A and the object B, and the object A and the object B transfer the virtual resources.

If the object C and the object D receive the virtual resources first, a virtual resource library needs to be created in advance, and the virtual resource library includes a specific virtual resource. The virtual resource in the virtual resource library is allocated to the object C and the object D, and then the virtual resource library is filled with the virtual resource transferred by the object A and the object B. In addition, if the object C and the object D receive the virtual resources first, the virtual resources received by the object C and the object D may be recovered when the object A and the object B do not transfer the virtual resources.

By using some embodiments, the target bill is transmitted to the first object set and the second object set by using the foregoing method, so that a moment at which the target bill is transmitted may be flexibly selected, thereby ensuring efficiency of transferring a virtual resource and improving flexibility of transmitting a target bill.

As an optional implementation, after the transmitting the target bill to the object included in the first object set and the object included in the second object set, the method further includes:
(1) receiving a virtual resource transferred by the object included in the first object set according to the resource value of the virtual resource recorded in the target bill, and transferring the virtual resource to the object included in the second object set according to the resource value of the virtual resource recorded in the target bill; or
(2) receiving a virtual resource transferred by the object included in the first object set according to the resource value of the virtual resource recorded in the target bill, and transferring, when the resource value of the virtual resource transferred by the first object set reaches the total resource value of the to-be-transferred virtual resource recorded in the target bill, the virtual resource to the object included in the second object set according to the resource value of the virtual resource recorded in the target bill; or
(3) transferring a virtual resource to the object included in the second object set according to the resource value of the virtual resource recorded in the target bill, and receiving, when the resource value of the virtual resource received by the second object set reaches the total resource value of the to-be-received virtual resource recorded in the target bill, the virtual resource transferred by the object included in the first object set according to the resource value of the virtual resource recorded in the target bill.

Optionally, when the object in the first object set transfers the virtual resource, the object in the second object set receives the virtual resource. For example, some objects in the first object set transfer a virtual resource, and some objects do not transfer a virtual resource. Therefore, the server allocates the transferred virtual resource to some objects in the second object set.

When the transferred virtual resource is allocated to some objects in the second object set, an allocation sequence may be determined according to a quantity of virtual resources to be received by the objects in the second object set.

Alternatively, when all the objects in the first object set have completed the resource transfer, the server transfers all the received virtual resources to all the objects in the second object set.

Alternatively, when all the objects in the second object set receive the virtual resources completely, the server charges the virtual resources from all the objects in the first object set according to the target bill.

By using some embodiments, the virtual resource transferred by the object in the first object set is transferred and the virtual resource is transmitted to the object in the second object set by using the foregoing method, thereby ensuring efficiency of transferring a virtual resource and improving flexibility of transferring a virtual resource.

As an optional implementation, the receiving a virtual resource transferred by the object included in the first object set according to the resource value of the virtual resource recorded in the target bill, and transferring the virtual resource to the object included in the second object set according to the resource value of the virtual resource recorded in the target bill includes:

S1. Deduct, according to a resource value of a virtual resource to be received by a target object in the second object set when a resource value of a virtual resource received from the first object set reaches a first resource value and the first resource value is greater than or equal to the resource value of the virtual resource to be received by the target object, the virtual resource from the virtual resource received from the first object set, and transferring the virtual resource to the target object according to the resource value of the virtual resource to be received by the target object.

Optionally, if the resource value of the virtual resource transferred by the first object set that is received by the server is greater than a resource value of a virtual resource that is to be received by an object in the second object set, the server deducts a redundant part, and transfers the virtual resource obtained after the redundant part is deducted to the object in the second object set. In addition, the deducted redundant virtual resource is returned to the object in the first object set according to the target bill.

By using some embodiments, when the received resource value of the virtual resource transferred by the object in the first object set exceeds the resource value of the virtual resource that is to be received by the object in the second object set, the virtual resource is transferred according to the resource value of the virtual resource that is to be received by the target object in the second object set, thereby ensuring efficiency of transferring a virtual resource and improving accuracy of transferring a virtual resource.

As an optional implementation, after the transmitting the target bill to the object included in the first object set and the object included in the second object set, the method further includes:

S1. Receive a first bill confirmation instruction transmitted by the object included in the first object set, the first bill confirmation instruction being used for instructing the object included in the first object set in the target bill to confirm a virtual resource to be transferred.

S2. Receive a second bill confirmation instruction transmitted by the object included in the second object set, the second bill confirmation instruction being used for instructing the object included in the second object set in the target bill to confirm a virtual resource to be received.

Optionally, when transferring a virtual resource, the object in the first object set further needs to transmit a confirmation instruction to the server. The confirmation instruction is used for confirming that the object in the first object set has checked a virtual resource to be transferred and allows to transfer the virtual resource to the object in the second object set.

When receiving a virtual resource, the object in the second object set further needs to transmit a confirmation instruction to the server. The confirmation instruction is used for confirming that the object in the second object set has checked a virtual resource to be received and allows to receive the virtual resource.

By using some embodiments, the first bill confirmation instruction transmitted by the object in the first object set and the second bill confirmation instruction transmitted by the object in the second object set are received, thereby ensuring efficiency of transferring a virtual resource and improving accuracy of transferring a virtual resource.

For simple description, the foregoing method embodiments are represented as a series of action combinations, but a person skilled in the art is to know that the present disclosure is not limited to the described order of the actions because some steps may be performed in another order or performed simultaneously according to the present disclosure. In addition, a person skilled in the art is to also appreciate that all the embodiments described in the specification are preferred embodiments, and the related actions and modules are not necessarily mandatory to the present disclosure.

Figure 6:
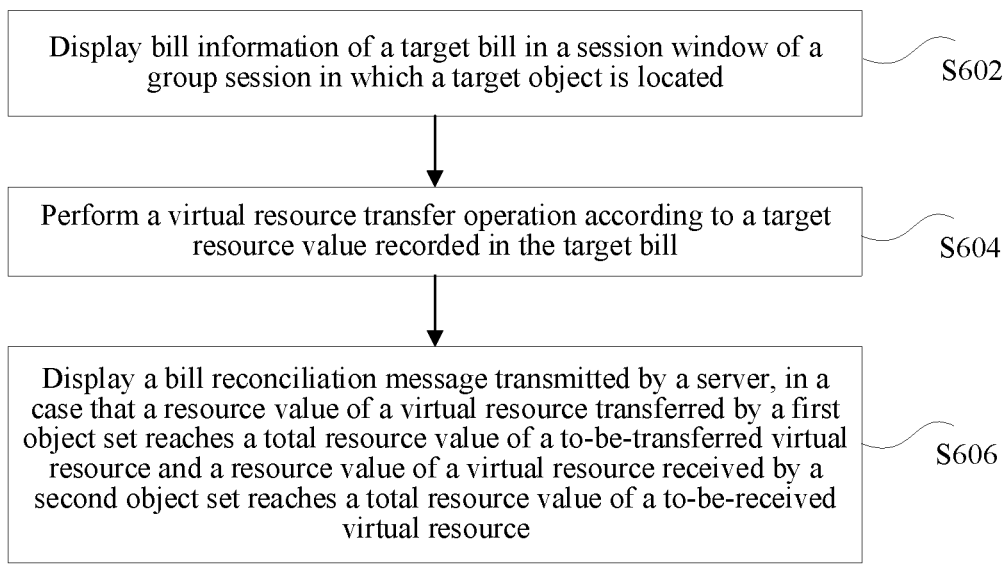
FIG. 6 is a schematic flowchart of another optional message exchange method according to an embodiment of the present disclosure.

According to another aspect of the embodiments of the present disclosure, a message exchange method is further provided. As an optional example, as shown in FIG. 6, the message exchange method may be implemented by user equipment. In some embodiments, a target object may be an object transferring a virtual resource in the message exchange, and the target object may transfer the virtual resource by logging in to a client in the user equipment.

The method includes the following steps:

S602. Display bill information of a target bill in a session window of a group session in which a target object is located, the to-be-processed target bill recording a resource value of a to-be-transferred virtual resource of an object included in a first object set and a resource value of a to-be-received virtual resource of an object included in a second object set, a total resource value of the to-be-transferred virtual resource recorded in the target bill being equal to a total resource value of the to-be-received virtual resource recorded in the target bill, the object included in the first object set and the object included in the second object set being located in the group session, and the target object being located in the first object set.

S604. Perform a virtual resource transfer operation according to a target resource value recorded in the target bill. The target resource value is used for identifying a virtual resource to be transferred by the target object, that is, reflecting a resource value of a virtual resource to be transferred.

S606. Display a bill reconciliation message when a resource value of a virtual resource transferred by the first object set reaches the total resource value of the to-be-transferred virtual resource and a resource value of a virtual resource received by the second object set reaches the total resource value of the to-be-received virtual resource, the bill reconciliation message being used for indicating that the target bill has been reconciled.

Optionally, the message exchange method may be applied to, but not limited to, the field of multi-people transfer of a multi-people session, or a process of asset transfer between a plurality of accounts of a person, or a process of article sale in the market that a plurality of people participate in, or the process of asset transfer in a multi-people game in the game field.

Optionally, the group session may be, but is not limited to, a session that a plurality of people participate in. The message exchange method being applied to the field of multi-people transfer of a multi-people session is described. The multi-people session may be, but is not limited to, a group session. An object in the group session initiates a bill creation request, and the bill creation request records a first object set for transferring a virtual resource value and a second object set for receiving a virtual resource value. Objects included in the first object set do not overlap objects included in the second object set. All the objects in the first object set transfer virtual resources according to a target bill, and a server receives the transferred virtual resources and transmits the transferred virtual resources to all the objects in the second object set according to the target bill.

Optionally, the bill reconciliation message may be transmitted by, but not limited to, a server. The server may be, but is not limited to, any hardware device that may provide a server function, or the server may be replaced with, but not limited to, a terminal device on which a server is built. For example, the server is built on the terminal device, and the terminal device provides a function provided by the server.

By using some embodiments, after the bill creation request is obtained, the target bill is generated, virtual resources are obtained from all the objects in the first object set according to the target bill, and the virtual resources are transferred to all the objects in the second object set, to achieve the objective of transferring the virtual resource by performing one operation on all the objects in the first object set and the second object set, thereby simplifying the operation of transferring the virtual resource and improving efficiency of processing a bill.

As an optional implementation, the displaying bill information of a to-be-processed target bill in a session window of a group session in which a target object is located includes one of the following:

(1) displaying a bill record of the target bill in the session window of the group session, the object included in the first object set and the object included in the second object set in the group session having a view permission for viewing the target bill; and (2) displaying, in the session window of the group session, prompt information for prompting that the target bill has been generated, and displaying the bill record of the target bill in a session window of a target session separately created for the target object.

Optionally, the bill record may be, but is not limited to, a record in which the object in the first object set transfers a virtual resource and/or the object in the second object set receives a virtual resource. The record may be displayed in the session window of the group session, or may be displayed in the session window separately created for the target object.

The record can be viewed only by an object having a permission, for example, a permission is configured for the object included in the first object set, the object included in the second object set, and an object initiating a target bill request. Another object in the group session cannot view the record.

Figure 7:
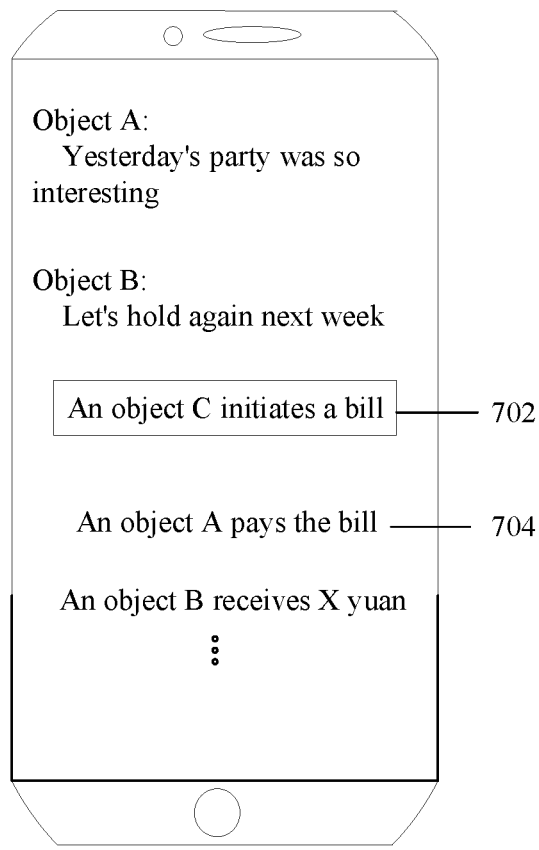
FIG. 7 is a schematic diagram of still another optional message exchange method according to an embodiment of the present disclosure.

For example, the record is displayed in the session window of the group session. FIG. 7 is an optional session window of a group session. A quick interface 702 of a target bill and a bill record 704 for transferring or receiving a virtual resource are displayed in a session window of a group session. After the quick interface 702 of the target bill is clicked, the picture jumps to a page for transferring a virtual resource or receiving a virtual resource.

By using some embodiments, the bill record of the target bill is displayed in the session window of the group session, or the bill record of the target bill is displayed in the session window of the target session that is created separately, thereby ensuring efficiency of transferring a virtual resource and improving display efficiency of the bill record of the target bill.

As an optional implementation, the performing a virtual resource transfer operation according to a target resource value of a virtual resource to be transferred by the target object recorded in the target bill includes the following steps.

S1. Obtain a first transfer instruction generated by performing an operation on a first operation panel displayed in a session window of a group session.

S2. Obtain, in response to the first transfer instruction, a target virtual resource corresponding to the target resource value from a resource library associated with the target object, and transfer the target virtual resource to a server.

S3. Display a first transfer result message in the session window of the group session, the first transfer result message being used for indicating a transfer result after the target object transfers the target virtual resource.

Figure 8:
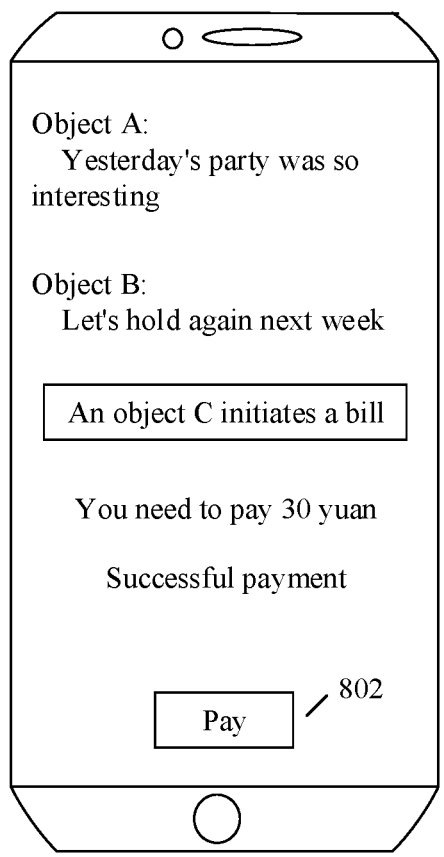
FIG. 8 is a schematic diagram of still another optional message exchange method according to an embodiment of the present disclosure.

For example, FIG. 8 is an optional display interface of a session window of a group session. A button 802 for triggering a first transfer instruction is set in the session window. That a target object needs to pay 30 yuan is displayed in the session window. When the button 802 is triggered, a client completes transfer of a virtual resource, and a message indicating a successful payment is displayed in the session window.

By using some embodiments, the target virtual resource corresponding to the target resource value is obtained from the resource library associated with the target object in response to the first transfer instruction, the target virtual resource is transferred to the server, and the first transfer result message is displayed, thereby improving efficiency of transferring a virtual resource.

As an optional implementation, the performing a virtual resource transfer operation according to a target resource value of a virtual resource to be transferred by the target object recorded in the target bill includes the following steps.

S1. Obtain a second transfer instruction generated by performing an operation on a second operation panel displayed in a session window of a target session.

S2. Obtain, in response to the second transfer instruction, a target virtual resource corresponding to the target resource value from a resource library associated with the target object, and transfer the target virtual resource to a server.

S3. Display a second transfer result message in the session window of the target session, the second transfer result message being used for indicating a transfer result after the target object transfers the target virtual resource.

Figure 9:
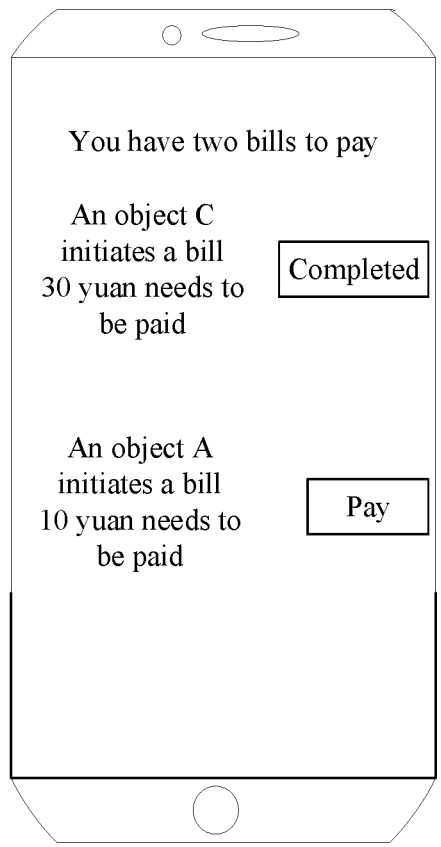
FIG. 9 is a schematic diagram of still another optional message exchange method according to an embodiment of the present disclosure.

For example, FIG. 9 is an optional session window of a target session. An initiated historical bill is recorded in the session window of the target session. A target object may perform a payment by selecting any one of bills, and after the payment is completed, a message indicating a completed payment is displayed in the session window.

By using some embodiments, the target virtual resource corresponding to the target resource value is obtained from the resource library associated with the target object in response to the second transfer instruction, the target virtual resource is transferred to the server, and the second transfer result message is displayed, thereby improving efficiency of transferring a virtual resource.

As an optional implementation, before the performing a virtual resource transfer operation according to a target resource value of a virtual resource to be transferred by the target object recorded in the target bill, the method further includes the following steps.

S1. Obtain a bill confirmation instruction, the bill confirmation instruction being used for confirming the target resource value of the virtual resource to be transferred by the target object in the target bill.

S2. Transmit the bill confirmation instruction to a server.

S3. Receive an operation prompt message transmitted by the server, the operation prompt message being used for prompting that the virtual resource transfer operation is allowed to be performed on the target object.

Optionally, before paying a bill, the target object further needs to check bill information, for example, a bill initiator, a bill initiation time, a bill amount, and a payment time limit. After the message is checked, a bill confirmation instruction is transmitted. After receiving the bill confirmation instruction, a client transmits the bill confirmation instruction to the server, and the server may transfer a virtual resource only after receiving the bill confirmation instruction.

By using some embodiments, the bill confirmation instruction is obtained, and the virtual resource transfer operation is performed according to the bill confirmation instruction, thereby ensuring efficiency of transferring a virtual resource and improving security of transferring a virtual resource.

As an optional implementation, the displaying bill information of a to-be-processed target bill in a session window of a group session in which a target object is located includes:

(1) obtaining a first bill request triggered by the target object, the first bill request being used for requesting to select a plurality of objects from the group session to generate the target bill, the plurality of objects being separately located in the first object set and the second object set, and displaying, in response to the first bill request, the bill information of the target bill; or (2) obtaining a second bill request triggered by another object located in the group session, the second bill request being used for requesting to select a plurality of objects from the group session to generate the target bill, the plurality of objects being separately located in the first object set and the second object set, the another object being an object other than the target object in the plurality of objects, and displaying, in response to the second bill request, the bill information of the target bill.

Optionally, the bill creation request may be triggered by, but not limited to, an object in the first object set, or triggered by an object in the second object set, or triggered by another object in the group session. The another object does not belong to the first object set and the second object set. That is, the target bill in the initiated bill processing request may include an initiator, or may not include an initiator. After receiving a first bill request initiated by a target object or a second bill request initiated by another object, a client displays all objects in a group session, then determines a first object set and a second object set according to the received instruction, and generates a target bill.

By using some embodiments, the bill information of the target bill is displayed according to the first bill request or the second bill request, thereby ensuring efficiency of transferring a virtual resource and improving flexibility of displaying the bill information of the target bill.

Figure 10:
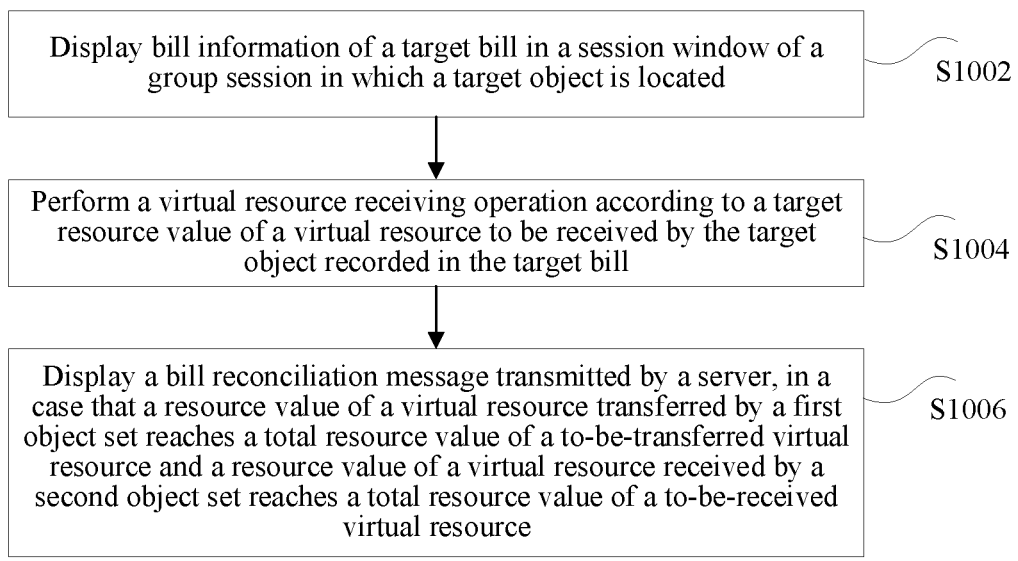
FIG. 10 is a schematic flowchart of still another optional message exchange method according to an embodiment of the present disclosure.

According to still another aspect of the embodiments of the present disclosure, a message exchange method is further provided. As an optional example, as shown in FIG. 10, the message exchange method may be implemented by user equipment. In some embodiments, a target object may be an object receiving a virtual resource in the message exchange, and the target object may receive the virtual resource by logging in to a client in the user equipment.

The method includes the following steps:

S1002. Display bill information of a target bill in a session window of a group session in which a target object is located, the to-be-processed target bill recording a resource value of a to-be-transferred virtual resource of an object included in a first object set and a resource value of a to-be-received virtual resource of an object included in a second object set, a total resource value of the to-be-transferred virtual resource recorded in the target bill being equal to a total resource value of the to-be-received virtual resource recorded in the target bill, the object included in the first object set and the object included in the second object set being located in the group session, and the target object being located in the second object set.

S1004. Perform a virtual resource receiving operation according to a target resource value of a virtual resource to be received by the target object recorded in the target bill.

S1006. Display a bill reconciliation message when a resource value of a virtual resource transferred by the first object set reaches the total resource value of the to-be-transferred virtual resource and a resource value of a virtual resource received by the second object set reaches the total resource value of the to-be-received virtual resource, the bill reconciliation message being used for indicating that the target bill has been reconciled.

Optionally, the message exchange method may be applied to, but not limited to, the field of multi-people transfer of a multi-people session, or a process of asset transfer between a plurality of accounts of a person, or a process of article sale in the market that a plurality of people participate in, or the process of asset transfer in a multi-people game in the game field.

Optionally, the group session may be, but is not limited to, a session that a plurality of people participate in. The message exchange method being applied to the field of multi-people transfer of a multi-people session is described. The multi-people session may be, but is not limited to, a group session. An object in the group session initiates a bill creation request, and the bill creation request records a first object set for transferring a virtual resource value and a second object set for receiving a virtual resource value. Objects included in the first object set do not overlap objects included in the second object set. All the objects in the first object set transfer virtual resources according to a target bill, and a server receives the transferred virtual resources and transmits the transferred virtual resources to all the objects in the second object set according to the target bill.

Optionally, the bill reconciliation message may be transmitted by, but not limited to, a server. The server may be, but is not limited to, any hardware device that may provide a server function, or the server may be replaced with, but not limited to, a terminal device on which a server is built. For example, the server is built on the terminal device, and the terminal device provides a function provided by the server.

By using some embodiments, after the bill creation request is obtained, the target bill is generated, virtual resources are obtained from all the objects in the first object set according to the target bill, and the virtual resources are transferred to all the objects in the second object set, to achieve the objective of transferring the virtual resource by performing one operation on all the objects in the first object set and the second object set, thereby simplifying the operation of transferring the virtual resource and improving efficiency of processing a bill.

As an optional implementation, the displaying bill information of a to-be-processed target bill in a session window of a group session in which a target object is located includes one of the following:

(1) displaying a bill record of the target bill in the session window of the group session, the object included in the first object set and the object included in the second object set in the group session having a view permission for viewing the target bill; and (2) displaying, in the session window of the group session, prompt information for prompting that the target bill has been generated, and displaying the bill record of the target bill in a session window of a target session separately created for the target object.

Optionally, the bill record may be, but is not limited to, a record in which the object in the first object set transfers a virtual resource and/or the object in the second object set receives a virtual resource. The record may be displayed in the session window of the group session, or may be displayed in the session window separately created for the target object.

The record can be viewed only by an object having a permission, for example, a permission is configured for the object included in the first object set, the object included in the second object set, and an object initiating a target bill request. Another object in the group session cannot view the record.

For example, the record is displayed in the session window of the group session. FIG. 7 is an optional session window of a group session. A quick interface 702 of a target bill and a bill record 704 for transferring or receiving a virtual resource are displayed in a session window of a group session. After the quick interface 702 of the target bill is clicked, the picture jumps to a page for transferring a virtual resource or receiving a virtual resource.

By using some embodiments, the bill record of the target bill is displayed in the session window of the group session, or the bill record of the target bill is displayed in the session window of the target session that is created separately, thereby ensuring efficiency of transferring a virtual resource and improving display efficiency of the bill record of the target bill.

As an optional implementation, the performing a virtual resource receiving operation according to a target resource value of a virtual resource to be received by the target object recorded in the target bill includes the following steps.

S1. Obtain a target virtual resource corresponding to the target resource value through a session window of a group session.

S2. Transfer the target virtual resource to a resource library associated with the target object.

Optionally, the resource library may be, but is not limited to, a bank account of a target object. After obtaining, through a session window of a group session, a virtual resource paid by another object, the target object stores the virtual resource to the bank account.

By using some embodiments, the target virtual resource corresponding to the target resource value is obtained from the resource library associated with the target object in response to the first transfer instruction, the target virtual resource is transferred to the server, and the first transfer result message is displayed, thereby improving efficiency of transferring a virtual resource.

As an optional implementation, the performing a virtual resource receiving operation according to a target resource value of a virtual resource to be received by the target object recorded in the target bill includes the following steps.

S1. Obtain a target virtual resource corresponding to the target resource value through a session window of a target session.

S2. Transfer the target virtual resource to a resource library associated with the target object.

Figure 11:
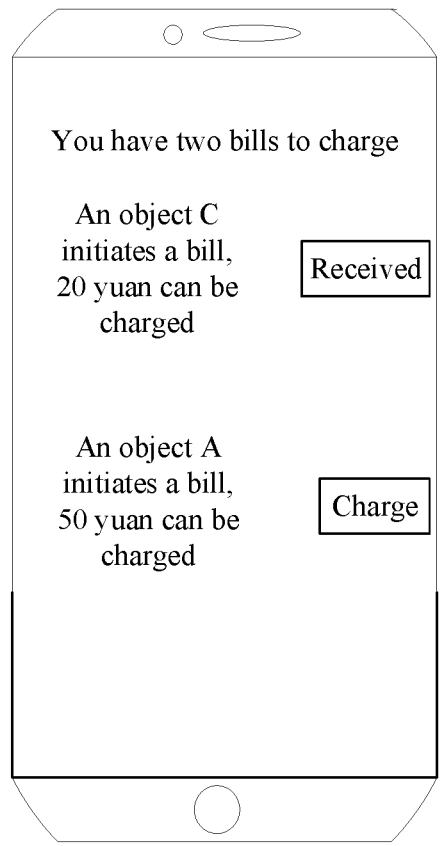
FIG. 11 is a schematic diagram of still another optional message exchange method according to an embodiment of the present disclosure.

For example, FIG. 11 is an optional display interface of a session window of a target session. A to-be-charged virtual resource is displayed in the session window. After a target object clicks a charging button to charge, a prompt word "received" is displayed in the session window. The target object stores the charged virtual resource into a bank account.

By using some embodiments, the target virtual resource corresponding to the target resource value is obtained from the resource library associated with the target object in response to the second transfer instruction, the target virtual resource is transferred to the server, and the second transfer result message is displayed, thereby improving efficiency of transferring a virtual resource.

As an optional implementation, before the performing a virtual resource receiving operation according to a target resource value of a virtual resource to be received by the target object recorded in the target bill, the method further includes the following steps.

S1. Obtain a bill confirmation instruction, the bill confirmation instruction being used for confirming the target resource value of the virtual resource to be received by the target object in the target bill.

S2. Transmit the bill confirmation instruction to a server.

S3. Receive an operation prompt message transmitted by the server, the operation prompt message being used for prompting that the virtual resource receiving operation is allowed to be performed on the target object.

Optionally, before receiving a virtual resource, the target object further needs to check bill information, for example, a bill initiator, a bill initiation time, a bill amount, and a charging time limit. After the message is checked, a bill confirmation instruction is transmitted. After receiving the bill confirmation instruction, a client transmits the bill confirmation instruction to the server, and the server may transfer a virtual resource only after receiving the bill confirmation instruction.

By using some embodiments, the bill confirmation instruction is obtained, and the virtual resource transfer operation is performed according to the bill confirmation instruction, thereby ensuring efficiency of transferring a virtual resource and improving security of transferring a virtual resource.

As an optional implementation, the displaying bill information of a target bill in a session window of a group session in which a target object is located specifically includes:

(1) obtaining a first bill request triggered by the target object, the first bill request being used for requesting to select a plurality of objects from the group session to generate the target bill, the plurality of objects being separately located in the first object set and the second object set, and displaying, in response to the first bill request, the bill information of the target bill in the session window of the group session; or (2) obtaining a second bill request triggered by another object located in the group session, the second bill request being used for requesting to select a plurality of objects from the group session to generate the target bill, the plurality of objects being separately located in the first object set and the second object set, the another object being an object other than the target object in the plurality of objects, and displaying, in response to the second bill request, the bill information of the target bill in the session window of the group session.

Optionally, the bill creation request may be triggered by, but not limited to, an object in the first object set, or triggered by an object in the second object set, or triggered by another object in the group session. The another object does not belong to the first object set and the second object set. That is, the target bill in the initiated bill processing request may include an initiator, or may not include an initiator. After receiving a first bill request initiated by a target object or a second bill request triggered by another object, a client displays all objects in a group session, then determines a first object set and a second object set according to the received instruction, and generates a target bill.

By using some embodiments, the bill information of the target bill is displayed according to the first bill request or the second bill request, thereby ensuring efficiency of transferring a virtual resource and improving flexibility of displaying the bill information of the target bill.

Figure 12:
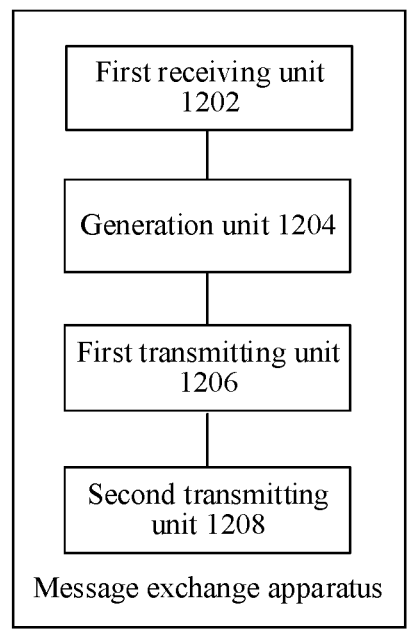
FIG. 12 is a schematic structural diagram of an optional message exchange apparatus according to an embodiment of the present disclosure.

According to still another aspect of the embodiments of the present disclosure, a message exchange apparatus is further provided. As an optional example, as shown in FIG. 12, the message exchange apparatus includes:

(1) a first receiving unit 1202, configured to receive a bill creation request initiated through a group session;

(2) a generation unit 1204, configured to generate a target bill in response to the bill creation request, the target bill recording a resource value of a to-be-transferred virtual resource of an object included in a first object set and a resource value of a to-be-received virtual resource of an object included in a second object set, a total resource value of the to-be-transferred virtual resource recorded in the target bill being equal to a total resource value of the to-be-received virtual resource recorded in the target bill, and the object included in the first object set and the object included in the second object set being located in the group session;

(3) a first transmitting unit 1206, configured to transmit the target bill to the object included in the first object set and the object included in the second object set, so that the object included in the first object set performs a virtual resource transfer operation according to the resource value of the to-be-transferred virtual resource recorded in the target bill and the object included in the second object set performs a virtual resource receiving operation according to the resource value of the to-be-received virtual resource recorded in the target bill; and (4) a second transmitting unit 1208, configured to instruct the target bill to be reconciled when a resource value of a virtual resource transferred by the first object set reaches the total resource value of the to-be-transferred virtual resource and a resource value of a virtual resource received by the second object set reaches the total resource value of the to-be-received virtual resource.

According to the method in some embodiments, after the bill creation request is obtained, the target bill is generated, virtual resources are obtained from all the objects in the first object set according to the target bill, and the virtual resources are transferred to all the objects in the second object set, to achieve the objective of transferring the virtual resource by performing one operation on all the objects in the first object set and the second object set, thereby simplifying the operation of transferring the virtual resource and improving efficiency of processing a bill.

As an optional implementation, the first transmitting unit includes:

(1) a first transmitting module, configured to synchronously transmit the target bill to the object included in the first object set and the object included in the second object set; or (2) a second transmitting module, configured to asynchronously transmit the target bill to the object included in the first object set and the object included in the second object set.

By using some embodiments, a server synchronously or asynchronously transmits the target bill to the object in the first object set and the object in the second object set, thereby ensuring efficiency of transferring a virtual resource and improving flexibility of transferring a virtual resource.

As an optional implementation, the second transmitting module includes:

(1) a first transmitting submodule, configured to transmit the target bill to the object included in the first object set, and transmit, when the resource value of the virtual resource transferred by the first object set has reached the total resource value of the to-be-transferred virtual resource recorded in the target bill, the target bill to the object included in the second object set; or (2) a second transmitting submodule, configured to transmit the target bill to the object included in the second object set, and transmit, when the resource value of the virtual resource received by the second object set has reached the total resource value of the to-be-received virtual resource recorded in the target bill, the target bill to the object included in the first object set.

By using some embodiments, the target bill is transmitted to the first object set and the second object set by using the foregoing method, so that a moment at which the target bill is transmitted may be flexibly selected, thereby ensuring efficiency of transferring a virtual resource and improving flexibility of transmitting a target bill.

As an optional implementation, the apparatus further includes:

(1) a second receiving unit, configured to receive a virtual resource transferred by the object included in the first object set according to the resource value of the virtual resource recorded in the target bill after the transmitting of the target bill to the object included in the first object set and the object included in the second object set, and transfer the virtual resource to the object included in the second object set according to the resource value of the virtual resource recorded in the target bill; or (2) a third receiving unit, configured to receive a virtual resource transferred by the object included in the first object set according to the resource value of the virtual resource recorded in the target bill after the transmitting of the target bill to the object included in the first object set and the object included in the second object set, and transfer, when the resource value of the virtual resource transferred by the first object set reaches the total resource value of the to-be-transferred virtual resource recorded in the target bill, the virtual resource to the object included in the second object set according to the resource value of the virtual resource recorded in the target bill; or (3) a fourth receiving unit, configured to transfer a virtual resource to the object included in the second object set according to the resource value of the virtual resource recorded in the target bill after the transmitting of the target bill to the object included in the first object set and the object included in the second object set, and receive, when the resource value of the virtual resource received by the second object set reaches the total resource value of the to-be-received virtual resource recorded in the target bill, the virtual resource transferred by the object included in the first object set according to the resource value of the virtual resource recorded in the target bill.

By using some embodiments, the virtual resource transferred by the object in the first object set is transferred and the virtual resource is transmitted to the object in the second object set by using the foregoing method, thereby ensuring efficiency of transferring a virtual resource and improving flexibility of transferring a virtual resource.

As an optional implementation, the second receiving unit includes:

(1) a deducting module, configured to deduct, according to a resource value of a virtual resource to be received by a target object in the second object set when a resource value of a virtual resource received from the first object set reaches a first resource value and the first resource value is greater than or equal to the resource value of the virtual resource to be received by the target object, the virtual resource from the virtual resource received from the first object set, and transfer the virtual resource to the target object according to the resource value of the virtual resource to be received by the target object.

By using some embodiments, when the received resource value of the virtual resource transferred by the object in the first object set exceeds the resource value of the virtual resource that is to be received by the object in the second object set, the virtual resource is transferred according to the resource value of the virtual resource that is to be received by the target object in the second object set, thereby ensuring efficiency of transferring a virtual resource and improving accuracy of transferring a virtual resource.

As an optional implementation, the apparatus further includes:

(1) a fifth receiving unit, configured to receive a first bill confirmation instruction transmitted by the object included in the first object set after the transmitting of the target bill to the object included in the first object set and the object included in the second object set, the first bill confirmation instruction being used for instructing the object included in the first object set in the target bill to confirm a virtual resource to be transferred; and (2) a sixth receiving unit, configured to receive a second bill confirmation instruction transmitted by the object included in the second object set, the second bill confirmation instruction being used for instructing the object included in the second object set in the target bill to confirm a virtual resource to be received.

By using some embodiments, the first bill confirmation instruction transmitted by the object in the first object set and the second bill confirmation instruction transmitted by the object in the second object set are received, thereby ensuring efficiency of transferring a virtual resource and improving accuracy of transferring a virtual resource.

Figure 13:
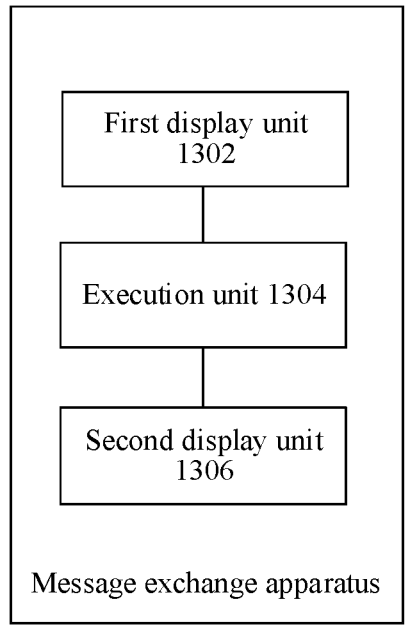
FIG. 13 is a schematic structural diagram of another optional message exchange apparatus according to an embodiment of the present disclosure.

According to still another aspect of the embodiments of the present disclosure, a message exchange apparatus is further provided. As an optional example, as shown in FIG. 13, the message exchange apparatus includes:

(1) a first display unit 1302, configured to display bill information of a to-be-processed target bill in a session window of a group session in which a target object is located, the target bill recording a resource value of a to-be-transferred virtual resource of an object included in a first object set and a resource value of a to-be-received virtual resource of an object included in a second object set, a total resource value of the to-be-transferred virtual resource recorded in the target bill being equal to a total resource value of the to-be-received virtual resource recorded in the target bill, the object included in the first object set and the object included in the second object set being located in the group session, and the target object being located in the first object set;

(2) an execution unit 1304, configured to perform a virtual resource transfer operation according to a target resource value of a virtual resource to be transferred by the target object recorded in the target bill; and (3) a second display unit 1306, configured to display a bill reconciliation message when a resource value of a virtual resource transferred by the first object set reaches the total resource value of the to-be-transferred virtual resource recorded in the target bill and a resource value of a virtual resource received by the second object set reaches the total resource value of the to-be-received virtual resource recorded in the target bill, the bill reconciliation message being used for indicating that the target bill has been reconciled.

By using some embodiments, after the bill creation request is obtained, the target bill is generated, virtual resources are obtained from all the objects in the first object set according to the target bill, and the virtual resources are transferred to all the objects in the second object set, to achieve the objective of transferring the virtual resource by performing one operation on all the objects in the first object set and the second object set, thereby simplifying the operation of transferring the virtual resource and improving efficiency of processing a bill.

As an optional implementation, the first display unit includes one of the following:

(1) a first display module, configured to display a bill record of the target bill in the session window of the group session, the first object set and the second object set in the group session having a view permission for viewing the target bill; and (2) a second display module, configured to display, in the session window of the group session, prompt information for prompting that the target bill has been generated, and display the bill record of the target bill in a session window of a target session separately created for the target object.

By using some embodiments, the bill record of the target bill is displayed in the session window of the group session, or the bill record of the target bill is displayed in the session window of the target session that is created separately, thereby ensuring efficiency of transferring a virtual resource and improving display efficiency of the bill record of the target bill.

As an optional implementation, the execution unit includes:

(1) a first obtaining module, configured to obtain a first transfer instruction generated by performing an operation on a first operation panel displayed in a session window of a group session;

(2) a second obtaining module, configured to obtain, in response to the first transfer instruction, a target virtual resource corresponding to the target resource value from a resource library associated with the target object, and transfer the target virtual resource to a server; and (3) a third display module, configured to display a first transfer result message in the session window of the group session, the first transfer result message being used for indicating a transfer result after the target object transfers the target virtual resource.

By using some embodiments, the target virtual resource corresponding to the target resource value is obtained from the resource library associated with the target object in response to the first transfer instruction, the target virtual resource is transferred to the server, and the first transfer result message is displayed, thereby improving efficiency of transferring a virtual resource.

As an optional implementation, the execution unit includes:
- (1) a fourth obtaining module, configured to obtain a second transfer instruction generated by performing an operation on a second operation panel displayed in a session window of a target session;
- (2) a fifth obtaining module, configured to obtain, in response to the second transfer instruction, a target virtual resource corresponding to the target resource value from a resource library associated with the target object, and transfer the target virtual resource to a server; and
- (3) a fourth display module, configured to display a second transfer result message in the session window of the target session, the second transfer result message being used for indicating a transfer result after the target object transfers the target virtual resource.

By using some embodiments, the target virtual resource corresponding to the target resource value is obtained from the resource library associated with the target object in response to the second transfer instruction, the target virtual resource is transferred to the server, and the second transfer result message is displayed, thereby improving efficiency of transferring a virtual resource.

As an optional implementation, the apparatus further includes:
- (1) an obtaining unit, configured to obtain a bill confirmation instruction before the performing of the virtual resource transfer operation according to the target resource value of the virtual resource to be transferred by the target object recorded in the target bill, the bill confirmation instruction being used for confirming the target resource value of the virtual resource to be transferred by the target object in the target bill;
- (2) a transmitting unit, configured to transmit the bill confirmation instruction to a server; and
- (3) a receiving unit, configured to receive an operation prompt message transmitted by the server, the operation prompt message being used for prompting that the virtual resource transfer operation is allowed to be performed on the target object.

By using some embodiments, the bill confirmation instruction is obtained, and the virtual resource transfer operation is performed according to the bill confirmation instruction, thereby ensuring efficiency of transferring a virtual resource and improving security of transferring a virtual resource.

As an optional implementation, the first display unit includes:
- (1) a seventh obtaining module, configured to obtain a first bill request triggered by the target object, the first bill request being used for requesting to select a plurality of objects from the group session to generate the target bill, the plurality of objects being separately located in the first object set and the second object set, and display, in response to the first bill request, the bill information of the target bill; or
- (2) an eighth obtaining module, configured to obtain a second bill request triggered by another object located in the group session, the second bill request being used for requesting to select a plurality of objects from the group session to generate the target bill, the plurality of objects being included in the first object set and the second object set, the another object being an object other than the target object in the plurality of objects, and display, in response to the second bill request, the bill information of the target bill.

By using some embodiments, the bill information of the target bill is displayed according to the first bill request or the second bill request, thereby ensuring efficiency of transferring a virtual resource and improving flexibility of displaying the bill information of the target bill.

Figure 14:
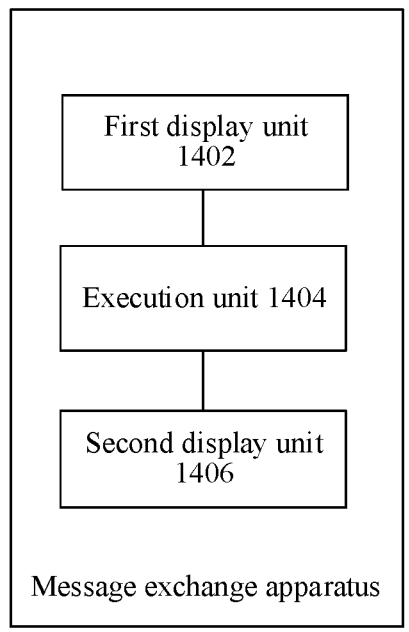
FIG. 14 is a schematic structural diagram of still another optional message exchange apparatus according to an embodiment of the present disclosure.

According to still another aspect of the embodiments of the present disclosure, a message exchange apparatus is further provided. As an optional example, as shown in FIG. 14, the message exchange apparatus includes:
- (1) a first display unit 1402, configured to display bill information of a to-be-processed target bill in a session window of a group session in which a target object is located, the target bill recording a resource value of a to-be-transferred virtual resource of an object included in a first object set and a resource value of a to-be-received virtual resource of an object included in a second object set, a total resource value of the to-be-transferred virtual resource recorded in the target bill being equal to a total resource value of the to-be-received virtual resource recorded in the target bill, the object included in the first object set and the object included in the second object set being located in the group session, and the target object being located in the second object set;
- (2) an execution unit 1404, configured to perform a virtual resource receiving operation according to a target resource value of a virtual resource to be transferred by the target object recorded in the target bill; and
- (3) a second display unit 1406, configured to display a bill reconciliation message when a resource value of a virtual resource transferred by the first object set reaches the total resource value of the to-be-transferred virtual resource recorded in the target bill and a resource value of a virtual resource received by the second object set reaches the total resource value of the to-be-received virtual resource recorded in the target bill, the bill reconciliation message being used for indicating that the target bill has been reconciled.

By using some embodiments, after the bill creation request is obtained, the target bill is generated, virtual resources are obtained from all the objects in the first object set according to the target bill, and the virtual resources are transferred to all the objects in the second object set, to achieve the objective of transferring the virtual resource by performing one operation on all the objects in the first object set and the second object set, thereby simplifying the operation of transferring the virtual resource and improving efficiency of processing a bill.

As an optional implementation, the execution unit includes one of the following:
- (1) a first display module, configured to display a bill record of the target bill in the session window of the group session, the first object set and the second object set in the group session having a view permission for viewing the target bill; and
- (2) a second display module, configured to display, in the session window of the group session, prompt information for prompting that the target bill has been generated, and display the bill record of the target bill in a session window of a target session separately created for the target object.

By using some embodiments, the bill record of the target bill is displayed in the session window of the group session, or the bill record of the target bill is displayed in the session window of the target session that is created separately, thereby ensuring efficiency of transferring a virtual resource and improving display efficiency of the bill record of the target bill.

As an optional implementation, the execution unit includes:
(1) a first obtaining module, configured to obtain a target virtual resource corresponding to the target resource value through a session window of a group session; and
(2) a first transfer module, configured to transfer the target virtual resource to a resource library associated with the target object.

By using some embodiments, the target virtual resource corresponding to the target resource value is obtained from the resource library associated with the target object in response to the first transfer instruction, the target virtual resource is transferred to the server, and the first transfer result message is displayed, thereby improving efficiency of transferring a virtual resource.

As an optional implementation, the execution unit includes:
(1) a second obtaining module, configured to obtain a target virtual resource corresponding to the target resource value through a session window of a target session; and
(2) a second transfer module, configured to transfer the target virtual resource to a resource library associated with the target object.

By using some embodiments, the target virtual resource corresponding to the target resource value is obtained from the resource library associated with the target object in response to the second transfer instruction, the target virtual resource is transferred to the server, and the second transfer result message is displayed, thereby improving efficiency of transferring a virtual resource.

As an optional implementation, the apparatus further includes:
(1) a first obtaining unit, configured to obtain a bill confirmation instruction before the performing of the virtual resource receiving operation according to the target resource value of a virtual resource to be received by the target object recorded in the target bill, the bill confirmation instruction being used for confirming the target resource value of the virtual resource to be received by the target object in the target bill;
(2) a transmitting unit, configured to transmit the bill confirmation instruction to a server; and
(3) a receiving unit, configured to receive an operation prompt message transmitted by the server, the operation prompt message being used for prompting that the virtual resource receiving operation is allowed to be performed on the target object.

By using some embodiments, the bill confirmation instruction is obtained, and the virtual resource transfer operation is performed according to the bill confirmation instruction, thereby ensuring efficiency of transferring a virtual resource and improving security of transferring a virtual resource.

As an optional implementation, the apparatus further includes:
(1) a second obtaining unit, configured to obtain a first bill request triggered by the target object before a bill processing request is obtained, the first bill request being used for requesting to select a plurality of objects from the group session to generate the target bill, the plurality of objects being included in the first object set and the second object set, and display, in response to the first bill request, the bill information of the target bill; or
(2) a third obtaining module, configured to obtain a second bill request triggered by another object located in the group session before a bill processing request is obtained, the second bill request being used for requesting to select a plurality of objects from the group session to generate the target bill, the plurality of objects being included in the first object set and the second object set, the another object being an object other than the target object in the plurality of objects, and display, in response to the second bill request, the bill information of the target bill.

By using some embodiments, the bill information of the target bill is displayed according to the first bill request or the second bill request, thereby ensuring efficiency of transferring a virtual resource and improving flexibility of displaying the bill information of the target bill.

Figure 15:
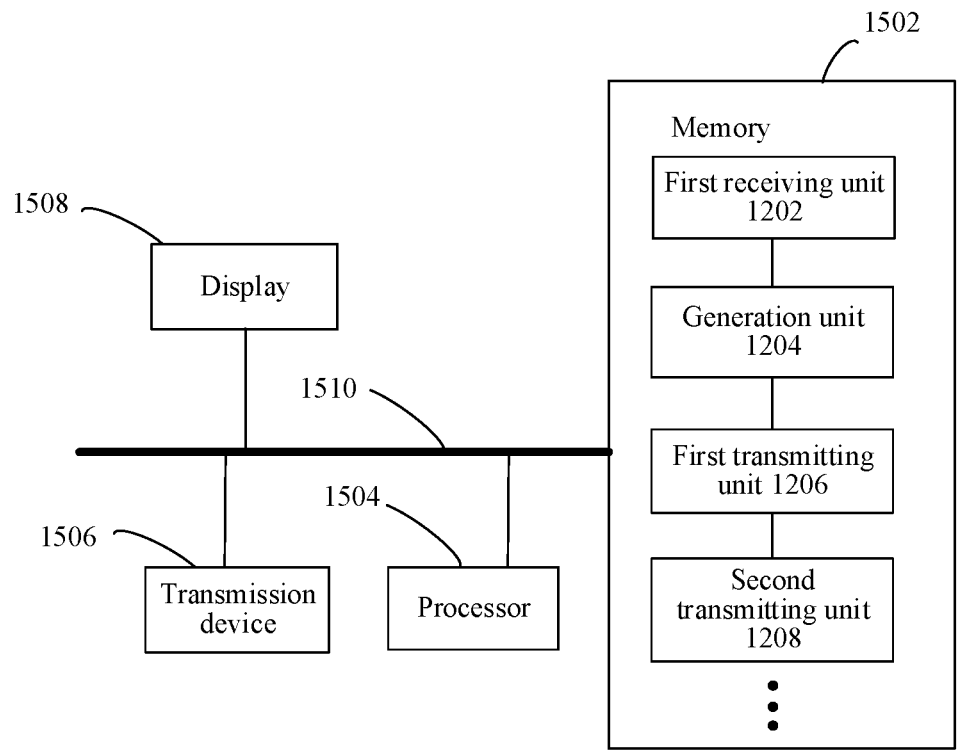
FIG. 15 is a schematic structural diagram of an optional electronic device according to an embodiment of the present disclosure.

According to still another aspect of the embodiments of the present disclosure, an electronic device configured to implement the foregoing message exchange method is further provided. As shown in FIG. 15, the electronic device includes a memory 1502 and a processor 1504, the memory 1502 storing a computer program, and the processor 1504 being configured to perform steps in any one of the foregoing method embodiments by using the computer program.

Optionally, in some embodiments, the foregoing electronic device may be located in at least one of a plurality of network devices in a computer network.

Optionally, in some embodiments, the processor may be configured to perform the following steps by using the computer program:

S1. Receive a bill creation request initiated through a group session.

S2. Generate a target bill in response to the bill creation request, the target bill recording a resource value of a to-be-transferred virtual resource of an object included in a first object set and a resource value of a to-be-received virtual resource of an object included in a second object set, a total resource value of the to-be-transferred virtual resource recorded in the target bill being equal to a total resource value of the to-be-received virtual resource recorded in the target bill, and the object included in the first object set and the object included in the second object set being located in the group session.

S3. Transmit the target bill to the object included in the first object set and the object included in the second object set, so that the object included in the first object set performs a virtual resource transfer operation according to the resource value of the to-be-transferred virtual resource recorded in the target bill and the object included in the second object set performs a virtual resource receiving operation according to the resource value of the to-be-received virtual resource recorded in the target bill.

S4. Indicate that the target bill has been reconciled when a resource value of a virtual resource transferred by the first object set reaches the total resource value of the to-be-transferred virtual resource and a resource value of a virtual resource received by the second object set reaches the total resource value of the to-be-received virtual resource.

Optionally, a person of ordinary skill in the art may understand that, the structure shown in FIG. 15 is only schematic. Alternatively, the electronic device may be a terminal device such as a smartphone (such as an Android mobile phone or an iOS mobile phone), a tablet computer, a palmtop computer, a mobile Internet device (MID), or a PAD. FIG. 15 does not constitute a limitation on a structure of the foregoing electronic device. For example, the electronic device may further include more or fewer components (such as a network interface and a display apparatus) than those shown in FIG. 15, or has a configuration different from that shown in FIG. 15.

The memory 1502 may be configured to store a software program and module, such as a program instruction/module corresponding to the message exchange method and apparatus in the embodiments of the present disclosure. The processor 1504 runs the software program and module stored in the memory 1502, to execute various function applications and data processing, that is, implement the foregoing message exchange method. The memory 1502 may include a high-speed random memory, and may further include a non-volatile memory such as one or more magnetic storage devices, a flash, or another non-volatile solid-state memory. In some examples, the memory 1502 may further include memories remotely disposed relative to the processor 1504, and the remote memories may be connected to a terminal through a network. Instances of the network include, but are not limited to, the Internet, an intranet, a local area network, a mobile communication network, and a combination thereof. Specifically, the memory 1502 is configured to store content such as a target bill and a resource value of a virtual resource. As an example, as shown in FIG. 15, the memory 1502 may include, but not limited to, a first receiving unit 1202, a generation unit 1204, a first transmitting unit 1206, a second transmitting unit 1208, and the like in the message exchange apparatus. In addition, the memory 1502 may further include, but not limited to, other modules and units in the message exchange apparatus. Details are not described herein again.

The electronic device includes a transmission device 1506, and the transmission device 1506 is configured to receive or send data through a network. Specific instances of the foregoing network may include a wired network and a wireless network. In an example, the transmission device 1506 includes a network interface controller (NIC). The NIC may be connected to another network device and a router by using a network cable, so as to communicate with the Internet or the local network. In an example, the transmission device 1506 is a radio frequency (RF) module, which communicates with the Internet in a wireless manner.

In addition, the electronic device further includes: a display 1508, configured to display content such as the target bill, and a connection bus 1510, configured to connect module components in the electronic device.

Figure 16:
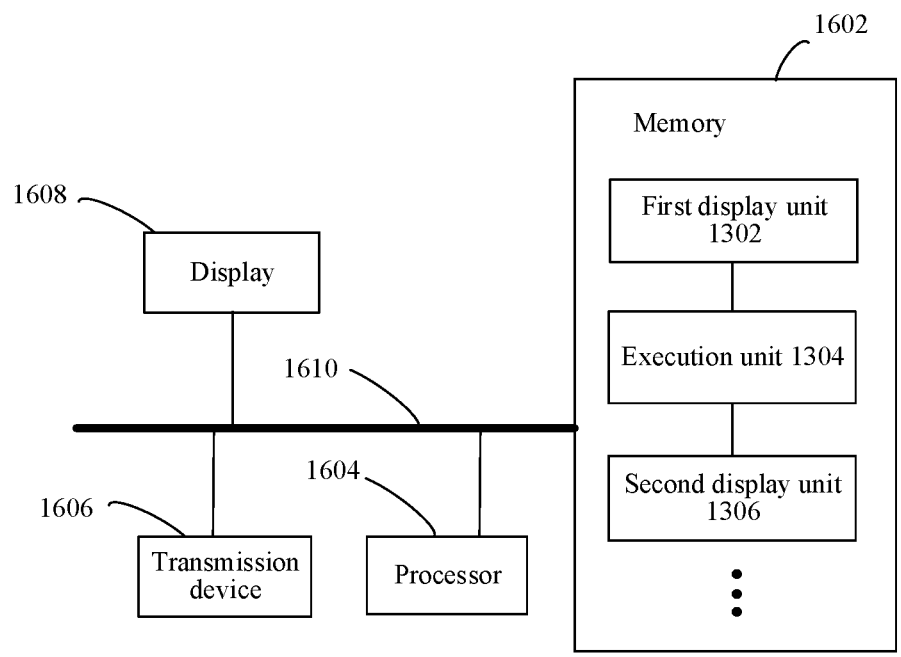
FIG. 16 is a schematic structural diagram of another optional electronic device according to an embodiment of the present disclosure.

According to still another aspect of the embodiments of the present disclosure, an electronic device configured to implement the foregoing message exchange method is further provided. As shown in FIG. 16, the electronic device includes a memory 1602 and a processor 1604, the memory 1602 storing a computer program, and the processor 1604 being configured to perform steps in any one of the foregoing method embodiments by using the computer program.

Optionally, in some embodiments, the foregoing electronic device may be located in at least one of a plurality of network devices in a computer network.

Optionally, in some embodiments, the processor may be configured to perform the following steps by using the computer program:

S1. Display bill information of a target bill in a session window of a group session in which a target object is located, the to-be-processed target bill recording a resource value of a to-be-transferred virtual resource of an object included in a first object set and a resource value of a to-be-received virtual resource of an object included in a second object set, a total resource value of the to-be-transferred virtual resource recorded in the target bill being equal to a total resource value of the to-be-received virtual resource recorded in the target bill, the object included in the first object set and the object included in the second object set being located in the group session, and the target object being located in the first object set.

S2. Perform a virtual resource transfer operation according to a target resource value recorded in the target bill, the target resource value being used for identifying a virtual resource to be transferred by the target object.

S3. Display a bill reconciliation message when a resource value of a virtual resource transferred by the first object set reaches the total resource value of the to-be-transferred virtual resource and a resource value of a virtual resource received by the second object set reaches the total resource value of the to-be-received virtual resource, the bill reconciliation message being used for indicating that the target bill has been reconciled.

Optionally, a person of ordinary skill in the art may understand that, the structure shown in FIG. 16 is only schematic. Alternatively, the electronic device may be a terminal device such as a smartphone (such as an Android mobile phone or an iOS mobile phone), a tablet computer, a palmtop computer, a mobile Internet device (MID), or a PAD. FIG. 16 does not constitute a limitation on a structure of the foregoing electronic device. For example, the electronic device may further include more or fewer components (such as a network interface and a display apparatus) than those shown in FIG. 16, or has a configuration different from that shown in FIG. 16.

The memory 1602 may be configured to store a software program and module, such as a program instruction/module corresponding to the message exchange method and apparatus in the embodiments of the present disclosure. The processor 1604 runs the software program and module stored in the memory 1602, to execute various function applications and data processing, that is, implement the foregoing message exchange method. The memory 1602 may include a high-speed random memory, and may further include a non-volatile memory such as one or more magnetic storage devices, a flash, or another non-volatile solid-state memory. In some examples, the memory 1602 may further include memories remotely disposed relative to the processor 1604, and the remote memories may be connected to a terminal through a network. Instances of the network include, but are not limited to, the Internet, an intranet, a local area network, a mobile communication network, and a combination thereof. Specifically, the memory 1602 is configured to store content such as a target bill and a resource value of a virtual resource. As an example, as shown in FIG. 16, the memory 1602 may include, but not limited to, a first display unit 1302, an execution unit 1304, a second display unit 1306, and the like in the message exchange apparatus. In addition, the memory 1602 may further include, but not limited to, other modules and units in the message exchange apparatus. Details are not described herein again.

The electronic device includes a transmission device 1606, and the transmission device 1606 is configured to receive or send data through a network. Specific instances of the foregoing network may include a wired network and a wireless network. In an example, the transmission device 1606 includes a network interface controller (NIC). The NIC may be connected to another network device and a router by using a network cable, so as to communicate with the Internet or the local network. In an example, the transmission device 1606 is a radio frequency (RF) module, which communicates with the Internet in a wireless manner.

In addition, the electronic device further includes: a display 1608, configured to display content such as the target bill, and a connection bus 1610, configured to connect module components in the electronic device.

Figure 17:
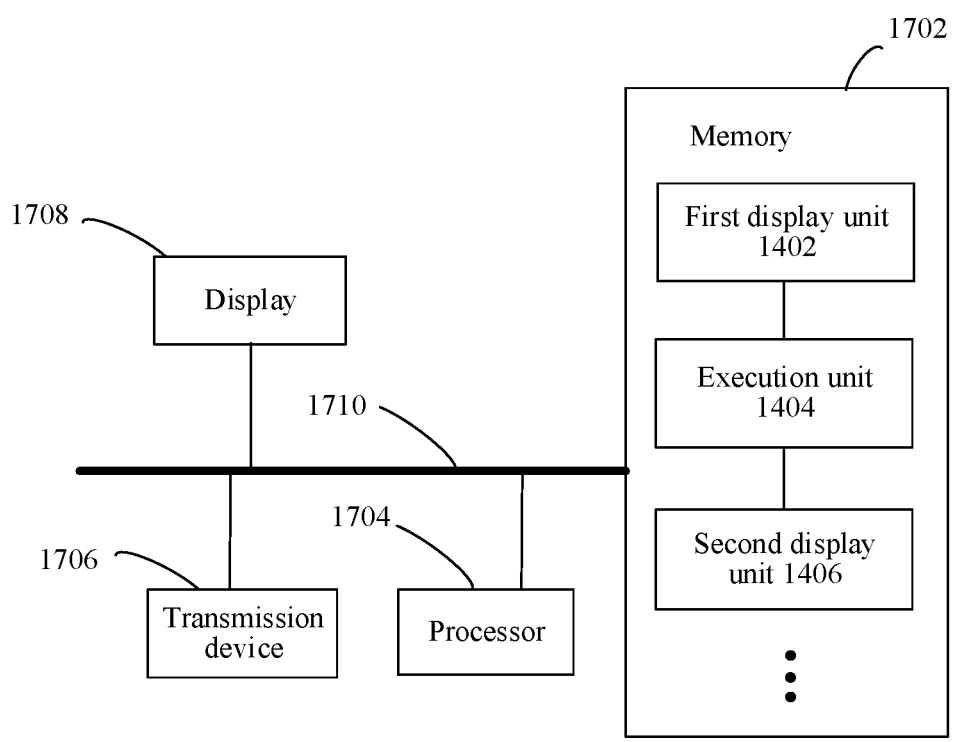
FIG. 17 is a schematic structural diagram of still another optional electronic device according to an embodiment of the present disclosure.

According to still another aspect of the embodiments of the present disclosure, an electronic device configured to implement the foregoing message exchange method is further provided. As shown in FIG. 17, the electronic device includes a memory 1702 and a processor 1704, the memory 1702 storing a computer program, and the processor 1704 being configured to perform steps in any one of the foregoing method embodiments by using the computer program.

Optionally, in some embodiments, the foregoing electronic device may be located in at least one of a plurality of network devices in a computer network.

Optionally, in some embodiments, the processor may be configured to perform the following steps by using the computer program:

S1. Display bill information of a target bill in a session window of a group session in which a target object is located, the to-be-processed target bill recording a resource value of a to-be-transferred virtual resource of an object included in a first object set and a resource value of a to-be-received virtual resource of an object included in a second object set, a total resource value of the to-be-transferred virtual resource recorded in the target bill being equal to a total resource value of the to-be-received virtual resource recorded in the target bill, the object included in the first object set and the object included in the second object set being located in the group session, and the target object being located in the second object set.

S2. Perform a virtual resource receiving operation according to a target resource value recorded in the target bill, the target resource value being used for identifying a virtual resource to be received by the target object.

S3. Display a bill reconciliation message when a resource value of a virtual resource transferred by the first object set reaches the total resource value of the to-be-transferred virtual resource and a resource value of a virtual resource received by the second object set reaches the total resource value of the to-be-received virtual resource, the bill reconciliation message being used for indicating that the target bill has been reconciled.

Optionally, a person of ordinary skill in the art may understand that, the structure shown in FIG. 17 is only schematic. Alternatively, the electronic device may be a terminal device such as a smartphone (such as an Android mobile phone or an iOS mobile phone), a tablet computer, a palmtop computer, a mobile Internet device (MID), or a PAD. FIG. 17 does not constitute a limitation on a structure of the foregoing electronic device. For example, the electronic device may further include more or fewer components (such as a network interface and a display apparatus) than those shown in FIG. 17, or has a configuration different from that shown in FIG. 17.

The memory 1702 may be configured to store a software program and module, such as a program instruction/module corresponding to the message exchange method and apparatus in the embodiments of the present disclosure. The processor 1704 runs the software program and module stored in the memory 1702, to execute various function applications and data processing, that is, implement the foregoing message exchange method. The memory 1702 may include a high-speed random memory, and may further include a non-volatile memory such as one or more magnetic storage devices, a flash, or another non-volatile solid-state memory. In some examples, the memory 1702 may further include memories remotely disposed relative to the processor 1704, and the remote memories may be connected to a terminal through a network. Instances of the network include, but are not limited to, the Internet, an intranet, a local area network, a mobile communication network, and a combination thereof. Specifically, the memory 1702 is configured to store content such as a target bill and a resource value of a virtual resource. As an example, as shown in FIG. 17, the memory 1702 may include, but not limited to, a first display unit 1402, an execution unit 1404, a second display unit 1406, and the like in the message exchange apparatus. In addition, the memory 1702 may further include, but not limited to, other modules and units in the message exchange apparatus. Details are not described herein again.

The electronic device includes a transmission device 1706, and the transmission device 1706 is configured to receive or send data through a network. Specific instances of the foregoing network may include a wired network and a wireless network. In an example, the transmission device 1706 includes a network interface controller (NIC). The NIC may be connected to another network device and a router by using a network cable, so as to communicate with the Internet or the local network. In an example, the transmission device 1706 is a radio frequency (RF) module, which communicates with the Internet in a wireless manner.

In addition, the electronic device further includes: a display 1708, configured to display content such as the target bill, and a connection bus 1710, configured to connect module components in the electronic device.

According to still another aspect of the embodiments of the present disclosure, a storage medium is further provided. The storage medium stores a computer program, the computer program being configured to perform steps in any one of the foregoing method embodiments when run.

Optionally, in some embodiments, the storage medium may be configured to store a computer program used for performing the following steps:

S1. Receive a bill creation request initiated through a group session.

S2. Generate a target bill in response to the bill creation request, the target bill recording a resource value of a to-be-transferred virtual resource of an object included in a first object set and a resource value of a to-be-received virtual resource of an object included in a second object set, a total resource value of the to-be-transferred virtual resource recorded in the target bill being equal to a total resource value of the to-be-received virtual resource recorded in the target bill, and the object included in the first object set and the object included in the second object set being located in the group session.

S3. Transmit the target bill to the object included in the first object set and the object included in the second object set, so that the object included in the first object set performs a virtual resource transfer operation according to the resource value of the to-be-transferred virtual resource recorded in the target bill and the object included in the second object set performs a virtual resource receiving operation according to the resource value of the to-be-received virtual resource recorded in the target bill.

S4. Indicate that the target bill has been reconciled when a resource value of a virtual resource transferred by the first object set reaches the total resource value of the to-be-transferred virtual resource and a resource value of a virtual resource received by the second object set reaches the total resource value of the to-be-received virtual resource.

Optionally, in some embodiments, the storage medium may be configured to store a computer program used for performing the following steps:

S1. Display bill information of a target bill in a session window of a group session in which a target object is located, the to-be-processed target bill recording a resource value of a to-be-transferred virtual resource of an object included in a first object set and a resource value of a to-be-received virtual resource of an object included in a second object set, a total resource value of the to-be-transferred virtual resource recorded in the target bill being equal to a total resource value of the to-be-received virtual resource recorded in the target bill, the object included in the first object set and the object included in the second object set being located in the group session, and the target object being located in the first object set.

S2. Perform a virtual resource transfer operation according to a target resource value recorded in the target bill, the target resource value being used for identifying a virtual resource to be transferred by the target object.

S3. Display a bill reconciliation message when a resource value of a virtual resource transferred by the first object set reaches the total resource value of the to-be-transferred virtual resource and a resource value of a virtual resource received by the second object set reaches the total resource value of the to-be-received virtual resource, the bill reconciliation message being used for indicating that the target bill has been reconciled.

Optionally, in some embodiments, the storage medium may be configured to store a computer program used for performing the following steps:

S1. Display bill information of a target bill in a session window of a group session in which a target object is located, the to-be-processed target bill recording a resource value of a to-be-transferred virtual resource of an object included in a first object set and a resource value of a to-be-received virtual resource of an object included in a second object set, a total resource value of the to-be-transferred virtual resource recorded in the target bill being equal to a total resource value of the to-be-received virtual resource recorded in the target bill, the object included in the first object set and the object included in the second object set being located in the group session, and the target object being located in the second object set.

S2. Perform a virtual resource receiving operation according to a target resource value recorded in the target bill, the target resource value being used for identifying a virtual resource to be received by the target object.

S3. Display a bill reconciliation message when a resource value of a virtual resource transferred by the first object set reaches the total resource value of the to-be-transferred virtual resource and a resource value of a virtual resource received by the second object set reaches the total resource value of the to-be-received virtual resource, the bill reconciliation message being used for indicating that the target bill has been reconciled.

Optionally, in some embodiments, a person of ordinary skill in the art may understand that all or some of the steps of the methods in the foregoing embodiments may be implemented by a program instructing relevant hardware of the terminal device. The program may be stored in a computer-readable storage medium. The storage medium may include a flash disk, a read-only memory (ROM), a random access memory (RAM), a magnetic disk, an optical disc, and the like.

An embodiment of the present disclosure further provides a computer program product including instructions, when run on a server, the computer program product enabling the server to perform the message exchange method according to the foregoing embodiments.

In the embodiments of the present disclosure, a bill creation request initiated through a group session is received; a target bill is generated in response to the bill creation request; the target bill is transmitted to an object included in a first object set and an object included in a second object set, so that the object included in the first object set performs a virtual resource transfer operation according to a resource value of a virtual resource recorded in the target bill and the object included in the second object set performs a virtual resource receiving operation according to a resource value of a virtual resource recorded in the target bill; and it indicates that the target bill has been reconciled when a resource value of a virtual resource transferred by the first object set and a resource value of a virtual resource received by the second object set reach a total resource value recorded in the target bill. In the method, after the bill creation request is obtained, the target bill is generated, virtual resources are obtained from all the objects in the first object set according to the target bill, and the virtual resources are transferred to all the objects in the second object set, to achieve the objective of transferring the virtual resource by performing one operation on all the objects in the first object set and the second object set, thereby simplifying the operation of transferring the virtual resource and resolving the technical problem in the related art that processing efficiency of a bill is low because a reconciliation processing operation is complex.

The sequence numbers of the embodiments of the present disclosure are merely for the convenience of description, and do not imply the preference among the embodiments.

In addition, each functional module/unit in various disclosed embodiments can be integrated in a processing unit, or each module/unit can exist separately and physically, or two or more modules/units can be integrated in one unit. The modules/units as disclosed above can be implemented in the form of hardware (e.g., processing circuitry and/or memory) and/or in the form of software functional unit(s) (e.g., developed using a computer programming language).

When the integrated unit in the foregoing embodiments is implemented in the form of a software function unit and sold or used as an independent product, the integrated unit may be stored in the foregoing computer-readable storage medium. Based on such an understanding, the technical solutions of the present disclosure essentially, or the part contributing to the prior art, or all or some of the technical solutions may be implemented in a form of a software product. The computer software product is stored in a storage medium and includes several instructions for instructing one or more computer devices (which may be a personal computer, a server, a network device, or the like) to perform all or some of the steps of the methods described in the present disclosure.

In the foregoing embodiments of the present disclosure, the description of each embodiment has respective focuses, and for the part that is not detailed in an embodiment, refer to the relevant description of other embodiments.

In the several embodiments provided in the present disclosure, it is understood that the disclosed client may be implemented in other manners. The apparatus embodiments described above are merely exemplary. For example, the division of the units is merely the division of logic functions, and may use other division manners during actual implementation. For example, a plurality of units or components may be combined, or may be integrated into another system, or some features may be omitted or not performed. In addition, the displayed or discussed mutual couplings or direct couplings or communication connections may be implemented through some interfaces. The indirect couplings or communication connections between the units or modules may be implemented in electronic or another form.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions in the embodiments.

In addition, functional units in the embodiments of the present disclosure may be integrated into one processing unit, or each of the units may exist alone physically, or two or more units may be integrated into one unit. The integrated unit may be implemented in a form of hardware, or may be implemented in a form of a software function unit.

The foregoing descriptions are merely exemplary implementations of the present disclosure. A person of ordinary skill in the art may make several improvements or polishing without departing from the principle of the present disclosure and the improvements or polishing shall fall within the protection scope of the present disclosure.

What is claimed is:

1. A message exchange method, comprising:
   receiving, by a server, a bill creation request initiated through a group session, wherein the bill creation request is generated by having a bill initiating button activated, and the bill initiating button being present on a session window of the group session, and wherein the session window is a messaging window, and the group session is a chat session between a plurality of messaging users in a same chat group of a social network application;
   generating, by the server in response to the bill creation request, a target bill, the target bill stating a resource value of a to-be-transferred virtual resource of an object comprised in a first object set and a resource value of a to-be-received virtual resource of an object comprised in a second object set, a total resource value of the to-be-transferred virtual resource stated in the target bill being equal to a total resource value of the to-be-received virtual resource stated in the target bill, and the object comprised in the first object set and the object comprised in the second object set being located in the group session, wherein the second object set includes at least two objects corresponding to the same single target bill to share the virtual resource transferred by the first object set, and the object comprised in the first object set and the at least two objects comprised in the second object set are from the plurality of messaging users of the same chat group;
   transmitting, by the server, the target bill to the group session where information of a bill record of the target bill is displayed in the session window of the group session, the target bill being configured with a view permission for the object comprised in the first object set, the object comprised in the second object set, and an object that initiates the bill creation request, so that the object comprised in the first object set performs a virtual resource transfer operation according to the resource value of the to-be-transferred virtual resource stated in the target bill and the object comprised in the second object set performs a virtual resource receiving operation according to the resource value of the to-be-received virtual resource stated in the target bill, wherein the view permission of the bill record is not given to an in-group object that belongs to the same chat group who has view permission of a chat record of the group session but is not comprised in the first or second object set or does not initiate the bill creation request;
   determining, by the server, whether a resource value of a virtual resource transferred by the first object set reaches the total resource value of the to-be-transferred virtual resource and a resource value of a virtual resource received by the second object set reaches the total resource value of the to-be-received virtual resource;
   determining, by the server, that the target bill has been reconciled in response to determining the resource value of the virtual resource transferred by the first object set reaches the total resource value of the to-be-transferred virtual resource and the resource value of the virtual resource received by the second object set reaches the total resource value of the to-be-received virtual resource; and
   determining, by the server, that the target bill has not been reconciled in response to determining the resource value of the virtual resource transferred by the first object set does not reach the total resource value of the to-be-transferred virtual resource or the resource value of the virtual resource received by the second object set does not reach the total resource value of the to-be-received virtual resource.

2. The method according to claim 1, wherein the transmitting, by the server, the target bill to the object comprised in the first object set and the object comprised in the second object set comprises:
   transmitting, by the server, the target bill to the object comprised in the first object set;
   determining, by the server, whether the resource value of the virtual resource transferred by the first object set reaches the total resource value of the to-be-transferred virtual resource;
   transmitting, by the server, the target bill to the object comprised in the second object set, in response to determining the resource value of the virtual resource transferred by the first object set reaches the total resource value of the to-be-transferred virtual resource; and
   determining to reject, by the server, transmission of the target bill to the object comprised in the second object set, in response to determining the resource value of the virtual resource transferred by the first object set does not reach the total resource value of the to-be-transferred virtual resource.

3. The method according to claim 1, wherein the transmitting, by the server, the target bill to the object comprised in the first object set and the object comprised in the second object set comprises:
   transmitting, by the server, the target bill to the object comprised in the second object set;
   determining, by the server, whether the resource value of the virtual resource received by the second object set reaches the total resource value of the to-be-received virtual resource;
   transmitting, by the server, the target bill to the object comprised in the first object set, in response to determining the resource value of the virtual resource received by the second object set reaches the total resource value of the to-be-received virtual resource; and determining to reject, by the server, transmission of the target bill to the object comprised in the first object set, in response to determining the resource value of the virtual resource received by the second object set does not reach the total resource value of the to-be-received virtual resource.

4. The method according to claim 1, wherein the method further comprises:
receiving, by the server, a virtual resource transferred by the object comprised in the first object set according to the resource value of the to-be-transferred virtual resource; and
transferring the virtual resource to the object comprised in the second object set according to the resource value of the to-be-received virtual resource.

5. The method according to claim 4, further comprising:
transferring, by the server, the virtual resource to the object comprised in the second object set according to the resource value of the to-be-received virtual resource, in response to determining the resource value of the virtual resource transferred by the first object set reaches the total resource value of the to-be-transferred virtual resource; and
determining to reject, by the server, transfer of the virtual resource to the object comprised in the second object set according to the resource value of the to-be-received virtual resource, in response to determining the resource value of the virtual resource transferred by the first object set does not reach the total resource value of the to-be-transferred virtual resource.

6. The method according to claim 4, wherein the receiving, by the server, a virtual resource transferred by the object comprised in the first object set according to the resource value of the to-be-transferred virtual resource, and transferring the virtual resource to the object comprised in the second object set according to the resource value of the to-be-received virtual resource comprises:
deducting, by the server according to a resource value of a virtual resource to be received by a target object in the second object set in response to determining a resource value of a virtual resource received from the first object set reaches a first resource value and the first resource value is greater than or equal to the resource value of the virtual resource to be received by the target object, the virtual resource from the virtual resource received from the first object set, and transferring the virtual resource to the target object according to the resource value of the virtual resource to be received by the target object; and
determining to reject, by the server, transfer of the virtual resource from the virtual resource received from the first object set, and to reject transfer of the virtual resource to the target object according to the resource value of the virtual resource to be received by the target object, in response to determining the resource value of the virtual resource received from the first object set does not reach the first resource value.

7. The method according to claim 1, wherein the method further comprises:
transferring, by the server, a virtual resource to the object comprised in the second object set according to the resource value of the to-be-received virtual resource;
receiving, by the server, in response to determining the resource value of the virtual resource received by the second object set reaches the total resource value of the to-be-received virtual resource, the virtual resource transferred by the object comprised in the first object set according to the resource value of the to-be-transferred virtual resource; and
determining to reject, by the server, receipt of the virtual resource transferred by the object comprised in the first object set according to the resource value of the to-be-transferred virtual resource, in response to determining the resource value of the virtual resource received by the second object set does not reach the total resource value of the to-be-received virtual resource.

8. The method according to claim 1, wherein after the transmitting, by the server, the target bill to the object comprised in the first object set and the object comprised in the second object set, the method further comprises:
receiving, by the server, a first bill confirmation instruction transmitted by the object comprised in the first object set, the first bill confirmation instruction confirming a virtual resource has been transferred; and
receiving, by the server, a second bill confirmation instruction transmitted by the object comprised in the second object set, the second bill confirmation instruction being used for instructing the object comprised in the second object set in the target bill to confirm a virtual resource to be received.

9. The method according to claim 1, further comprising:
creating a virtual resource library;
respectively allocating a virtual resource value of the virtual resource library to the at least two objects comprised in the second object set; and
filling the virtual resource library with the resource value of the virtual resource transferred by the first object set,
wherein the allocating of the virtual resource value to the second object set that comprises receivers of the virtual resource is performed before completion of the filling of the resource value from the first object set that comprises senders of the virtual resource.

10. The method according to claim 9, further comprising:
in response to that the resource value of the virtual resource is not transferred by the first object set, returning the virtual resource value of the virtual resource library respectively allocated to the at least two objects comprised in the second object set back into the virtual resource library.

11. The method according to claim 1, wherein
the information of the bill record of the target bill is displayed in the session window of the group session following the chat record of the group.

12. An electronic device, comprising a memory and a processor, the memory storing a computer program, and the processor executing the computer program and performing:
receiving a bill creation request initiated through a group session, wherein the bill creation request is generated by having a bill initiating button activated, and the bill initiating button being present on a session window of the group session, wherein the session window is a messaging window, and the group session is a chat session between a plurality of messaging users in a same chat group;
generating, in response to the bill creation request, a target bill, the target bill stating a resource value of a to-be-transferred virtual resource of an object comprised in a first object set and a resource value of a to-be-received virtual resource of an object comprised in a second object set, a total resource value of the to-be-transferred virtual resource stated in the target bill being equal to a total resource value of the to-be-received virtual resource stated in the target bill, and the object comprised in the first object set and the object comprised in the second object set being located in the group session, wherein the second object set includes at least two objects corresponding to the same single target bill to share the virtual resource transferred by the first object set, and the object comprised in the first object set and the at least two objects comprised in the second object set are from the plurality of messaging users of the same chat group;

transmitting the target bill to the group session where information of a bill record of the target bill is displayed in the session window of the group session, the target bill being configured with a view permission for the object comprised in the first object set, the object comprised in the second object set, and an object that initiates the bill creation request, so that the object comprised in the first object set performs a virtual resource transfer operation according to the resource value of the to-be-transferred virtual resource stated in the target bill and the object comprised in the second object set performs a virtual resource receiving operation according to the resource value of the to-be-received virtual resource stated in the target bill, wherein an in-group object that belongs to the same chat group but is not comprised in the first or second object set or does not initiate the bill creation request has view permission of a chat record of the group session and does not have the view permission of the bill record;

determining whether a resource value of a virtual resource transferred by the first object set reaches the total resource value of the to-be-transferred virtual resource and a resource value of a virtual resource received by the second object set reaches the total resource value of the to-be-received virtual resource;

determining that the target bill has been reconciled in response to determining the resource value of the virtual resource transferred by the first object set reaches the total resource value of the to-be-transferred virtual resource and the resource value of the virtual resource received by the second object set reaches the total resource value of the to-be-received virtual resource; and determining that the target bill has not been reconciled in response to determining the resource value of the virtual resource transferred by the first object set does not reach the total resource value of the to-be-transferred virtual resource or the resource value of the virtual resource received by the second object set does not the total resource value of the to-be-received virtual resource.

13. The device according to claim 12, wherein the transmitting the target bill to the object comprised in the first object set and the object comprised in the second object set comprises:

transmitting the target bill to the object comprised in the first object set;

determining whether the resource value of the virtual resource transferred by the first object set reaches the total resource value of the to-be-transferred virtual resource;

transmitting the target bill to the object comprised in the second object set, in response to determining the resource value of the virtual resource transferred by the first object set reaches the total resource value of the to-be-transferred virtual resource; and determining to reject transmission of the target bill to the object comprised in the second object set, in response to determining the resource value of the virtual resource transferred by the first object set does not reach the total resource value of the to-be-transferred virtual resource.

14. The device according to claim 12, wherein the transmitting the target bill to the object comprised in the first object set and the object comprised in the second object set comprises:

transmitting the target bill to the object comprised in the second object set;

determining whether the resource value of the virtual resource received by the second object set reaches the total resource value of the to-be-received virtual resource;

transmitting the target bill to the object comprised in the first object set, in response to determining the resource value of the virtual resource received by the second object set reaches the total resource value of the to-be-received virtual resource; and determining to reject transmission of the target bill to the object comprised in the first object set, in response to determining the resource value of the virtual resource received by the second object set does not reach the total resource value of the to-be-received virtual resource.

15. The device according to claim 12, wherein the processor is further configured to perform:

receiving a virtual resource transferred by the object comprised in the first object set according to the resource value of the to-be-transferred virtual resource; and transferring the virtual resource to the object comprised in the second object set according to the resource value of the to-be-received virtual resource.

16. The device according to claim 15, wherein the processor further performs:

transferring the virtual resource to the object comprised in the second object set according to the resource value of the to-be-received virtual resource, in response to determining the resource value of the virtual resource transferred by the first object set reaches the total resource value of the to-be-transferred virtual resource; and determining to reject transfer of the virtual resource to the object comprised in the second object set according to the resource value of the to-be-received virtual resource, in response to determining the resource value of the virtual resource transferred by the first object set does not reach the total resource value of the to-be-transferred virtual resource.

17. The device according to claim 15, wherein the receiving a virtual resource transferred by the object comprised in the first object set according to the resource value of the to-be-transferred virtual resource, and transferring the virtual resource to the object comprised in the second object set according to the resource value of the to-be-received virtual resource comprises:

deducting, according to a resource value of a virtual resource to be received by a target object in the second object set in response to determining a resource value of a virtual resource received from the first object set reaches a first resource value and the first resource value is greater than or equal to the resource value of the virtual resource to be received by the target object, the virtual resource from the virtual resource received from the first object set, and transferring the virtual resource to the target object according to the resource value of the virtual resource to be received by the target object; and determining to reject, by the server, deduction of the virtual resource from the virtual resource received from the first object set, and to reject transfer of the virtual resource to the target object according to the resource value of the virtual resource to be received by the target object, in response to determining the resource value of the virtual resource received from the first object set does not reach the first resource value.

18. The device according to claim 12, wherein the processor further performs:

transferring a virtual resource to the object comprised in the second object set according to the resource value of the to-be-received virtual resource;

receiving, in response to determining the resource value of the virtual resource received by the second object set reaches the total resource value of the to-be-received virtual resource, the virtual resource transferred by the object comprised in the first object set according to the resource value of the to-be-transferred virtual resource; and determining to reject receipt of the virtual resource transferred by the object comprised in the first object set according to the resource value of the to-be-transferred virtual resource, in response to determining the resource value of the virtual resource received by the second object set does not reach the total resource value of the to-be-received virtual resource.

19. The device according to claim 12, wherein after the transmitting the target bill to the object comprised in the first object set and the object comprised in the second object set, the processor is further configured to perform:

receiving a first bill confirmation instruction transmitted by the object comprised in the first object set, the first bill confirmation instruction confirming a virtual resource has been transferred; and receiving a second bill confirmation instruction transmitted by the object comprised in the second object set, the second bill confirmation instruction being used for instructing the object comprised in the second object set in the target bill to confirm a virtual resource to be received.

20. A non-transitory storage medium, storing a computer program, the computer program being executed by one or more processor and performing:

receiving a bill creation request initiated through a group session, wherein the bill creation request is generated by having a bill initiating button activated, and the bill initiating button being present on a session window of the group session, and wherein the session window is a messaging window, and the group session is a chat session between a plurality of messaging users in a same chat group of a social network application;

generating, in response to the bill creation request, a target bill, the target bill recording a resource value of a to-be-transferred virtual resource of an object comprised in a first object set and a resource value of a to-be-received virtual resource of an object comprised in a second object set, a total resource value of the to-be-transferred virtual resource recorded in the target bill being equal to a total resource value of the to-be-received virtual resource recorded in the target bill, and the object comprised in the first object set and the object comprised in the second object set being located in the group session, wherein the second object set includes at least two objects corresponding to the same single target bill to share the virtual resource transferred by the first object set and the object comprised in the first object set and the at least two objects comprised in the second object set are from the plurality of messaging users of the same chat group;

transmitting the target bill to the group session where information of a bill record of the target bill is displayed in the session window of the group session, the target bill being configured with a view permission for the object comprised in the first object set, the object comprised in the second object set, and an object that initiates the bill creation request, so that the object comprised in the first object set performs a virtual resource transfer operation according to the resource value of the to-be-transferred virtual resource stated in the target bill and the object comprised in the second object set performs a virtual resource receiving operation according to the resource value of the to-be-received virtual resource stated in the target bill, wherein an in-group object that belongs to the same chat group but is not comprised in the first or second object set or does not initiate the bill creation request has view permission of a chat record of the group session and does not have the view permission of the bill record;

determining whether a resource value of a virtual resource transferred by the first object set reaches the total resource value of the to-be-transferred virtual resource and a resource value of a virtual resource received by the second object set reaches the total resource value of the to-be-received virtual resource;

determining that the target bill has been reconciled in response to determining the resource value of the virtual resource transferred by the first object set reaches the total resource value of the to-be-transferred virtual resource and the resource value of the virtual resource received by the second object set reaches the total resource value of the to-be-received virtual resource; and determining that the target bill has not been reconciled in response to determining the resource value of the virtual resource transferred by the first object set does not reach the total resource value of the to-be-transferred virtual resource or the resource value of the virtual resource received by the second object set does not the total resource value of the to-be-received virtual resource.

* * * * *